US008126810B2

(12) United States Patent
Shen et al.

(10) Patent No.: US 8,126,810 B2
(45) Date of Patent: Feb. 28, 2012

(54) APPARATUS AND METHOD OF FLEXIBLE AND COMMON IPMP SYSTEM FOR PROVIDING AND PROTECTING CONTENT

(75) Inventors: Sheng Mei Shen, Singapore (SG); Ming Ji, Singapore (SG); Takanori Senoh, Hirakata (JP); Takuyo Kogure, Neyagawa (JP)

(73) Assignee: Panasonic Corporation, Osaka (JP)

( * ) Notice: Subject to any disclaimer, the term of this patent is extended or adjusted under 35 U.S.C. 154(b) by 1647 days.

(21) Appl. No.: 10/470,738

(22) PCT Filed: Jun. 4, 2002

(86) PCT No.: PCT/JP02/05468

§ 371 (c)(1),
(2), (4) Date: Dec. 9, 2003

(87) PCT Pub. No.: WO02/100037

PCT Pub. Date: Dec. 12, 2002

(65) Prior Publication Data

US 2004/0236956 A1    Nov. 25, 2004

(30) Foreign Application Priority Data

Jun. 4, 2001  (JP) ................................. 2001-168259
Jun. 7, 2001  (JP) ................................. 2001-172451

(51) Int. Cl.
*G06F 21/00* (2006.01)

(52) U.S. Cl. ................ 705/51; 705/57; 705/58; 705/59; 709/229; 713/189; 713/193; 725/25; 725/30; 725/31

(58) Field of Classification Search .............. 705/50–79; 713/189, 193; 725/25, 30, 31
See application file for complete search history.

(56) References Cited

U.S. PATENT DOCUMENTS

| 6,236,727 | B1* | 5/2001 | Ciacelli et al. ................ 380/212 |
| 6,418,421 | B1* | 7/2002 | Hurtado et al. ................. 705/54 |
| 6,535,919 | B1* | 3/2003 | Inoue et al. .................... 709/229 |
| 6,763,071 | B1* | 7/2004 | Maeda et al. ............. 375/240.25 |
| 7,079,655 | B1* | 7/2006 | Tochikubo et al. ........... 380/281 |

(Continued)

FOREIGN PATENT DOCUMENTS

KR  2000-0006543    1/2000

(Continued)

OTHER PUBLICATIONS

M. Ji et al., "Proposal on IPMP tools information and IPMP tools Management," ISO/IEC JTC1/SC29/WG11 M7119, Singapore, Mar. 3, 2001, XP002414847.

(Continued)

*Primary Examiner* — Mamon Obeid
(74) *Attorney, Agent, or Firm* — Greenblum & Bernstein, P.L.C.

(57) ABSTRACT

An apparatus for a flexible and common IPMP System (Intellectual Property Management and Protection) offers flexibility and interoperability by incorporating a complete IPMP Tool List stored in the content stream or downloaded from a URL location. The IPMP Tool Manager of a compliant IPMP terminal functioning as a preprocessor module is provided, the IPMP Tool List is parsed, and an IPMP Tool is acquired based on the IPMP Tool ID, related location identifier, and IPMP Tool Format ID. The IPMP Tool can be precompiled to a binary format and sent or downloaded to the IPMP terminal, and different binary formats are prepared by the content provider for use on different IPMP terminal platforms.

6 Claims, 12 Drawing Sheets

U.S. PATENT DOCUMENTS

| | | | |
|---|---|---|---|
| 7,099,491 B2 * | 8/2006 | Takaku | 382/100 |
| 7,177,841 B2 * | 2/2007 | Inoue et al. | 705/51 |
| 7,308,717 B2 * | 12/2007 | Koved et al. | 726/27 |
| 2001/0041061 A1 | 11/2001 | Nakagawa | |
| 2002/0035723 A1 * | 3/2002 | Inoue et al. | 725/1 |
| 2002/0143975 A1 * | 10/2002 | Kimura et al. | 709/231 |
| 2002/0156712 A1 * | 10/2002 | Rambhia | 705/36 |
| 2003/0120541 A1 * | 6/2003 | Siann et al. | 705/14 |
| 2003/0149780 A1 * | 8/2003 | Inoue et al. | 709/229 |
| 2004/0107356 A1 * | 6/2004 | Shamoon et al. | 713/193 |
| 2004/0128128 A1 * | 7/2004 | Wang et al. | 704/229 |
| 2004/0225890 A1 * | 11/2004 | Kang et al. | 713/193 |
| 2008/0240420 A1 * | 10/2008 | Oxford | 380/28 |

FOREIGN PATENT DOCUMENTS

| | | |
|---|---|---|
| KR | 2001-0098558 | 11/2001 |
| WO | 99/48296 | 9/1999 |

OTHER PUBLICATIONS

Alattar et al., "Improved Selective Encryption Techniques for Secure Transmission of MPEG Video Bit-Streams," Image Processing, 1999, ICCIP 99, Proceedings, 1999 International Conference on Kobe, Japan, Oct. 24-28, 1999, pp. 256-260, XP010368705.

McGinty, "Working Draft 2.0 of ISO/IEC 14496-1:2000/AMD3," ISO/IEC JTC 1/SC 29/WG11 N3871, Jan. 2001, XP002414848.

Rambhia, "Solutions for IPMP Information Routing," ISO/IEC JTC1/SC29/WG11//M7149, Mar. 2001, XP002414849.

Shen et al., "IPMP Tools Management Function for MPEG-n IPMP System," ISO/IEC JTCI/SC29/WG11 M7153, Mar. 2001, XP002414851.

Kaneko, "A Proposal on IPMP," ISO/IEC JTC1/SC29/WG11 MPEG98/M3539, Jul. 1998, pp. 1-16; XP002397213.

Ji et al., "IPMP Tools List and Tools Retrieval for Mpeg4 IPMP extention," ISO/IEC JTC1/SC29/WG11 M7209, Jun. 8, 2001, XP002414851.

"OPIMA Specification Version 1.1", Jun. 27, 2000.

MPEG-4 Intellectual Property Management & Protection (IPMP) Overview & Applications.

"Intellectual Property Management and Protection in MPEG Standards", Jan. 2001.

"MPEG-4 Intellectual Property Management & Protection (IPMP) Overview & Applications Document", The Why and How of IPMP in MPEG-4, Dec. 1998, >http://mpeg.telecomitalialab.com/working_documents.htm>.

English language Abstract and partial translation of KR 2000-0006543.

English language Abstract and partial translation of KR 2001-0098558.

Tadashi Kaneko, "MPEG-4 Chosakuken Kanri—Shien Field no Tokucho", Information Processing Society of Japan Kenkyu Hokoku, vol. 99, No. 11, Jan. 30, 1999, pp. 25-32, and an English language partial translation thereof.

Tadashi Kaneko, "MPEG-4 ni okeru Chosakuken Shikibetsu Kanri no Hyojun Doko ni tsuite", Information Processing Society of Japan Kenkyu Hokoku, vol. 98, No. 52, May 29, 1998, pp. 75-82, and an English language partial translation thereof.

ISO/IEC, "Information technology—Coding of audio-visual objects—Part 13: Intellectual Property Management and Protection (IPMP) extensions", ISO/IEC 1/SC 29, ISO/IEC FDIS 14496-13:2003 (E), Feb. 19, 2003.

* cited by examiner

Fig.11

MESSAGE 1

| | |
|---|---|
| MESSAGE ID = | USER REGISTRATION |
| USER NAME = | MATSUSHITA TARO |
| PAYMENT METHOD = | CREDIT CARD NUMBER |
| USER TERMINAL INFORMATION = WINDOWS OS | |

MESSAGE 2

| | |
|---|---|
| MESSAGE ID = | INITIALIZATION SETTINGS |
| USER ID = | XYZ |
| IPMP INFORMATION = | CONTENT LIST |
| IPMP TOOL INFORMATION = DECRYPTION MODULE ID, LOCATION | |
| IPMP TOOL INFORMATION = USAGE RULES MANAGEMENT MODULE ID, LOCATION | |

MESSAGE 3

| | |
|---|---|
| MESSAGE ID = | CONTENT REQUEST |
| USER ID = | XYZ |
| CONTENT INFORMATION = CONTENT ID | |

MESSAGE 4

| | |
|---|---|
| MESSAGE ID = | CONTENT DISTRIBUTION |
| IPMP INFORMATION = | USAGE RULES 1 |
| IPMP INFORMATION = | DECRYPTION KEY 1 |
| CONTENT INFORMATION = ENCRYPTED CONTENT 1 | |

Fig.12

USAGE RULES 1

| | |
|---|---|
| USABLE PERIOD = | 2001. 6. 1 TO 2001. 6. 30 |
| FREE PLAYBACK TIME = | 1 MINUTE |
| NO. OF PLAYABLE TIMES = | 3 |
| COPIES ALLOWED = | 1 |
| NO. OF MOVES ALLOWED = | 5 |

APPARATUS AND METHOD OF FLEXIBLE AND COMMON IPMP SYSTEM FOR PROVIDING AND PROTECTING CONTENT

TECHNICAL FIELD

The present invention relates to providing and protecting content, and relates particularly to applications that consume protected content by means of different IPMP Systems and protect the same content by means of different IPMP Systems.

BACKGROUND ART

Demand for providing multimedia content continues to grow, and content can be delivered anywhere at any time. Users are pleased with the convenience and flexibility, and are able to enjoy entertainment easily and efficiently.

Content owners endeavor to satisfy the needs of their users, but at the same time are concerned about the unauthorized use of their intellectual property. There is a balance between these two concerns.

Numerous protection methods for protecting content are available, including data encryption, watermarking, and password protection. These protection methods are used by numerous content provider applications. It appears that different systems provide protected content using different mechanisms and protection methods. All terminals and content consumption devices in this case simply run and consume content provided by the same content provider. With the above-noted protection methods it is not possible to exchange these terminals or devices and play back different content.

People in the MPEG Standards Group are working toward standardizing an IPMP System with a compliant terminal. Regardless of the type of IPMP Tools used, all terminals can play back protected content protected by encryption according the same IPMP standard such as described below.

Terminals such as this have a content decoder such as an audio and video decoder, and must be able to remove the protection from the protected content before the content can be decoded and played back. Protection information including an IPMP Tool List is therefore needed to understand how to remove the protection, and is needed for a terminal to be able to use the content.

IPMP Tools are not fixed to certain predetermined tools. This involves using a header to increase the flexibility whereby the tools preferred by a particular IPMP System can be selected. To achieve this, however, it is necessary to define a standard method and interface that can simultaneously provide both greater flexibility and security.

The prior art relating to terminals of this type is basically as shown in FIG. 1. FIG. 1 shows the task flow through real-time user authentication, IPMP Tool searching, and content decoding.

Different headers use the same content decoders, such as MPEG-2 or MPEG-4, but user authentication and IPMP Tool searches in the prior art are performed completely differently with different headers. This makes it extremely difficult to manufacture a single terminal that can run different content provided by different content providers. In other words, the same protected content cannot be played back using different IPMP Systems.

DISCLOSURE OF INVENTION

Technical Problem to be Solved by the Invention

The problem to be solved is therefore to define a single IPMP System configuration enabling different IPMP Systems to consume the same protected content, and provide a standard method to IPMP System implementers and construct a complete system from encoder and channel provision to terminals using a safe method.

How the Problem is Solved

The present invention provides a flexible, common IPMP (Intellectual Property Management and Protection) system apparatus with versatility and interoperability by obtaining a complete IPMP Tool List stored in the content stream or downloaded from a URL location.

The IPMP Tool Manager of a standard IPMP terminal functioning as a preprocessor module parses the IPMP Tool List, and gets the IPMP Tool based on the IPMP Tool ID and related location identifier, and the IPMP Tool Format ID.

So that the IPMP Tool can be precompiled in a binary format and sent or downloaded to an IPMP terminal, the content provider supplies different binary formats for different IPMP terminal platforms.

Three major, general interfaces are specified for methods of data decryption, digital watermarking, and watermarking and data decryption according to extremely useful and typical application requirements.

A first embodiment of the present invention proposes a structure with a minimum of two layers, defines user authentication output messages, and provides better security and terminal compatibility with respect to different IPMP Systems.

Terminal complexity and IPMP Tool diversity are handled by defining different profiles for getting and using the IPMP Tools.

First, the IPMP Tool is defined as a specific packet located in the content stream and containing the following content:
list of IPMP Tools used to protect the content,
format ID of the downloaded IPMP Tool,
location type of the IPMP Tool, and
location from where the IPMP Tool can be gotten.

The IPMP Tool List flag is located in a header before the packet.

The IPMP Tool Manager is designed as a module located before the content decoder, parses the IPMP Tool List contained in the content stream or stored somewhere, and gets the IPMP Tool for removing protection from the content stream.

A general interface is specified for the IPMP terminal so that the downloaded IPMP Tool can be used on the IPMP terminal. This interface is defined so that substantially all different algorithms based on a certain tool can be handled.

While incorporating two security layers to provide greater security, output conditions relating to different user authentication methods are determined for terminal compatibility.

IPMP Tool IDs are defined in a predetermined table, and the table can be pre-encoded or downloaded to the terminal. Both the content provider and terminal must reference the same table and use the same IPMP Tool ID for the same IPMP Tool.

The terminal can have an IPMP Tool treated as a standard IPMP Tool preinstalled, or if the terminal has a downloading function can download a proprietary IPMP Tool based on the IPMP Tool List contained in the content stream.

The encryption key is encrypted based on the two-layer security structure and inserted to the IPMP information, and is sent to the terminal with the content stream.

Media content is encoded using the MPEG-2, MPEG-4, or other such encoding technique by the content provider, and is encrypted using an IPMP Tool such as DES or AES. A digital watermark may be embedded in the content.

The IPMP Tool List flag indicates that what follows thereafter is the IPMP Tool List.

Any terminal can get or find such content, but cannot play the content back without an appropriate license and the corresponding or correct IPMP Tool.

The terminal passes the IPMP Tool List to the IPMP Tool Manager module to get the IPMP Tool.

The acquired IPMP Tool can be used on the terminal and is prepared for a predefined interface stored on the IPMP terminal.

When the content stream begins to pass through the content decoder, the IPMP System activates the user authentication module, and sends a cense request to the content provider or provider agent by supplying the user terminal ID, content ID, and other related information. A license will be issued to the user terminal after the user authentication being successfully completed.

Finally, the encrypted key is decrypted, the encrypted content is also decrypted, and the content can be decoded and played back by the terminal.

BRIEF DESCRIPTION OF DRAWINGS

FIG. 8(*b*) shows the configuration of partial encryption without an encoder.

FIG. 8(*c*) shows a partial decryption configuration.

FIG. 11 shows a specific example of a message.

FIG. 12 shows an example of IPMP information in the message.

BEST MODE FOR CARRYING OUT THE INVENTION

Figure 1:
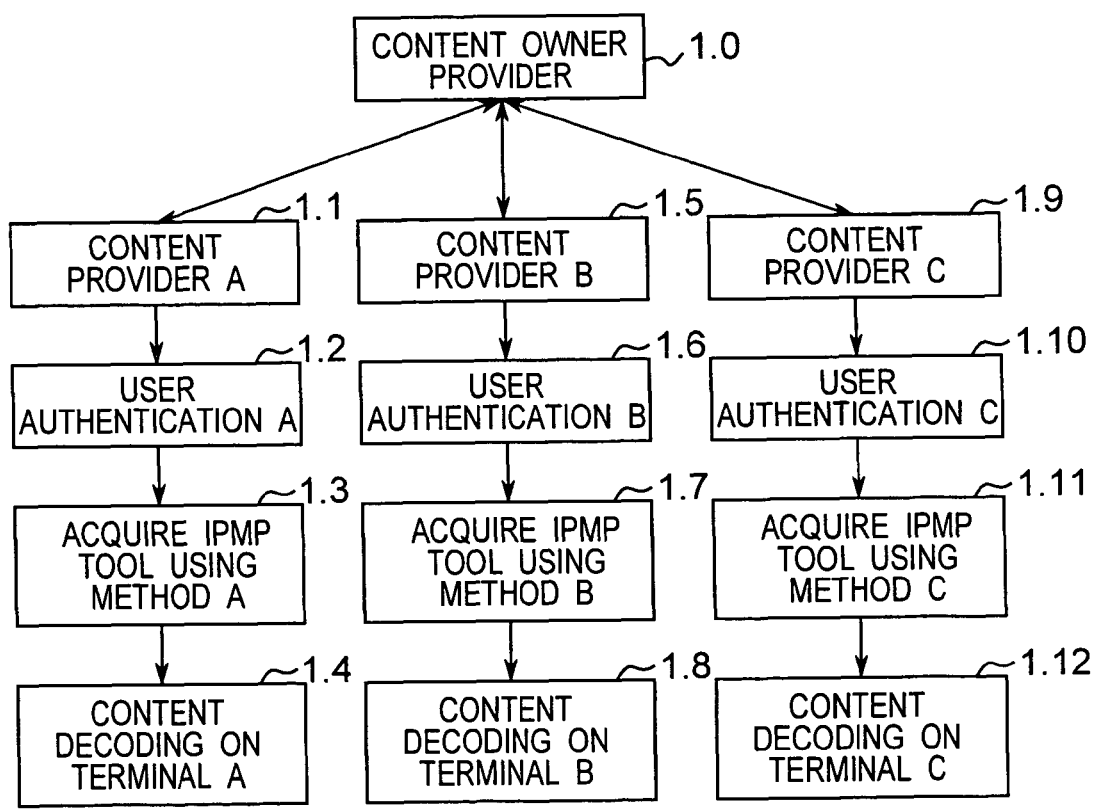
FIG. 1 shows an existing IPMP System for providing and protecting content according to the prior art.

FIG. 1 shows a current typical IPMP (Intellectual Property Management and Protection) system.

The content owner unit 1.0 provides content through different content providers A, B, and C shown as units 1.1, 1.5, and 1.9. Different IPMP Systems are run as the IPMP Systems of the three content providers.

Because IPMP Tools (such as encryption tools) using different protocols and different user authentication tools are used, methods for getting and checking the IPMP Tools are based on the particular protocol. Different user authentication methods are shown in units 1.2, 1.6, and 1.10, and different methods for getting the IPMP Tools are shown in units 1.3, 1.7, and 1.11.

Therefore, as shown in units 1.4, 1.8, and 1.12, the content decoding or content consumption terminals are also mutually different. It is obvious that terminal A cannot play back protected content provided by content provider B.

The following issues have been solved by the inventors in previous patent applications:

1). Storing IPMP Tool Information in the stream and indicating which IPMP Tool is used by the content provider and content distributor;

2) Processing IPMP information using IPMP Tool management on a standard IPMP terminal;

3) Defining profiles for IPMP terminals with different processing capabilities, and achieving an IPMP System.

Two problems remain unsolved by these previous applications as described below:

1) The problem of the download tool format being dependent on the terminal operating system and platform;

2) The problem of the interface for the IPMP Tool to be used on the IPMP terminal.

The present invention is described as a more specific and more complete version of the IPMP System taught in the previous patent applications, and handling these two problems is described in detail.

Figure 2:
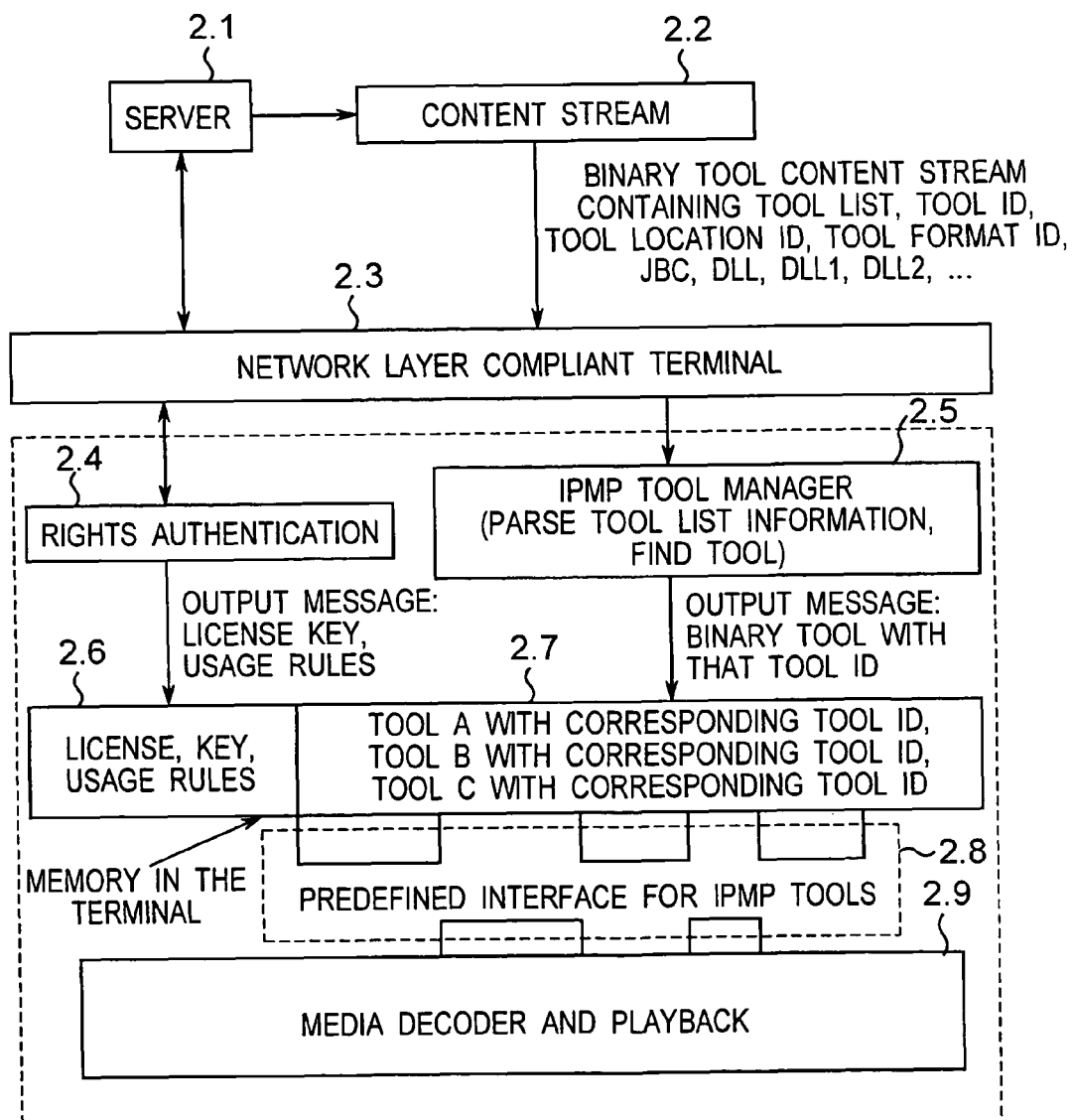
FIG. 2 is a general figure of a standard IPMP System.

FIG. 2 shows an MPEG-n IPMP System.

The server is indicated by module 2.1 and functions as either the content provider or content distributor, though in another scenario could function as both.

The network layer is indicated by module 2.3, and handles communication between a compliant IPMP terminal and the server, and content stream transmission from the server to the terminal.

First, rights verification in module 2.4 starts talking with the server to get detailed usage rules, such as the output messages of the rights verification module, and content access and consumption rights. These preformatted messages are stored in the terminal's memory for later use. Details about specifying the output message field are described later.

When content access rights are granted by module 2.4, the server sends the requested content stream via the network layer to the terminal.

In addition to different binary tool formats such as JBC (Java byte code) and DLL (dynamic link library) in addition to other formats for other dedicated platforms and operating systems, module 2.2 sends the content stream together with tool list information including the tool ID, tool location ID, and tool format ID. Details about specifying the tool list information are described later.

The IPMP Tool Manager shown in module 2.5 parses and interprets the tool list information and at the same time finds the IPMP Tool according to the tool location ID and tool format ID. The output message from module 2.5 is a suitable IPMP Tool having a descriptor tool ID indicating the tool content. The IPMP Tool itself is a binary format selected, found, and appropriate to the terminal platform based on a common tool format ID predetermined by IPMP standards.

The license/key and usage rules are stored in terminal memory as shown in module 2.6 for further processing. The binary IPMP Tool having the corresponding tool ID is -stored in terminal memory as shown in module 2.7. Each of these tools is built according a general standard interface, and are precompiled using a compiler for platform compatibility. For example, a data encryption and decryption tool can be built based on one specified interface for general use. For example, it could be precompiled to Java byte code (JBC) for use with a Java Virtual Machine on all platforms and terminals, or it could be precompiled to a dynamic link library (DLL) for the Windows platform and terminals.

Binary format tools can be transmitted compressed in a zip file, for example. These tools can be illegally modified using tampering prevention software, or can be signed using a signing method to prevent breaking or hacking the binary code.

Module 2.8 denotes an interface for an IPMP Tool that is predefined and must be followed by the IPMP Tool provider and terminal implementer.

The base layer is the content decoder and presenter shown in module 2.9. This layer is built using a hook interface for IPMP Tools in a binary format that is located in another component of the base layer and operates smoothly with that component.

The general interfaces are described below with respect to three types IPMP Tools (a decryption interface, digital watermarking interface, and watermarking and decryption interface). The rights authentication interface cannot be predefined because it is greatly affected by the application, and is therefore processed using a parametric tool rather than being defined here and fixed.

The detailed description is divided into four parts below.
1. IPMP Tool List and IPMP Tool Manager
1.1 Definition of the IPMP Tool List and IPMP Tool Manager IPMP information is defined in the IPMP summary as information enabling a particular IPMP Tool to request and correctly process particular protected content.

An IPMP Tool is defined as a module for implementing such IPMP functions as authentication, encryption, and watermarking by predefined methods.

The present invention introduces a definition for an IPMP Tool List.

An IPMP Tool List includes information requiring the IPMP Tool Manager to identify the IPMP Tool and find the IPMP Tool. This includes a unique IPMP Tool identification, an IPMP Tool Location identifier, and defining the relationship between the IPMP Tool ID and content ID.

The IPMP Tool Manager is defined as follows.

Figure 3:
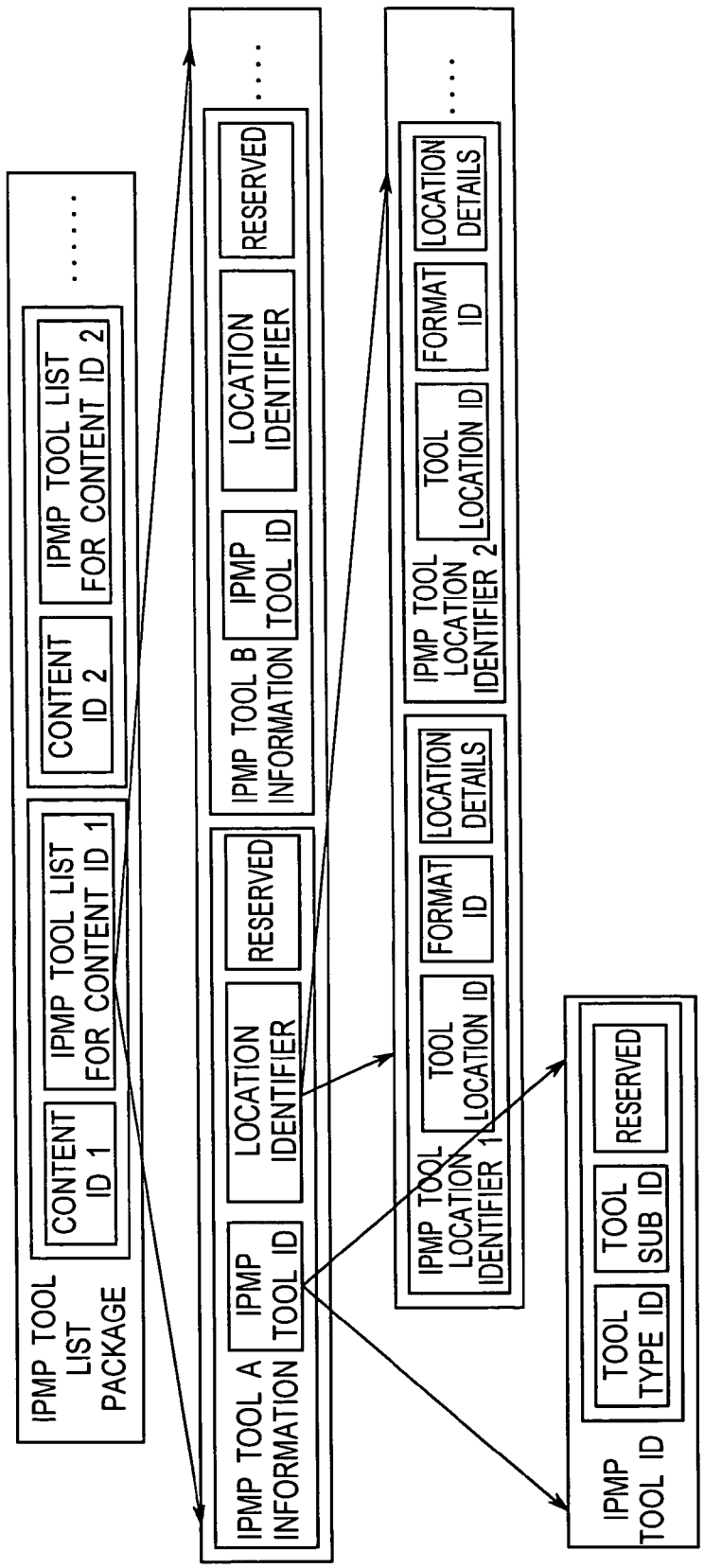
FIG. 3 shows the configuration of an IPMP Tool List packet stored in the content stream.

The IPMP Tool Manager is an entity whose sole role is to process the IPMP Tool List and find the IPMP Tool required to consume the entire content stream.
1.2 IPMP Tool List The detailed structure of this IPMP Tool List packet is shown best in FIG. 3 as follows.

The IPMP Tool List packet includes all IPMP Tool Information required to consume the protected content. If the content includes two or more content types, for example, if the first part of the content is from content provider A and the second part is from content provider B, information relating to the respective IPMP Tools is grouped according to the respective content IDs.

The IPMP Tool List for each content ID contains the IPMP Tool Information for each content ID, and the order of the IPMP Tool Information is not important.

The IPMP Tool Information has three major parts, that is, the IPMP Tool ID, IPMP Tool Location identifier, and IPMP Format ID.

The IPMP Tool ID identifies the tool using a specific method, and has at least two parts, the tool type ID and tool sub ID.

The tool type ID specifies the category of the specific IPMP Tool (from the position of the tool function), for example, decryption, watermark extraction, watermark detection, and rights extraction. The following table provisionally sets the length of the tool type ID as 4 bits able to handle 16 IPMP Tool categories.

Furthermore, the tool sub ID identifies a particular IPMP Tool, and the sub ID is provisionally set, as shown in the following table, with 12 bits, a length able to identify 4096 different tools within one tool type.

TABLE 1

IPMP Tool ID list

| Tool function | IPMP tool ID | IPMP tool name | Notes |
| --- | --- | --- | --- |
| Decryption tool | ...0001 000000000000... | DESDecrypt | 4096 |
| | ...0001 000000000001... | AESDecrypt | different tools are |
| | ...0001 000000000010... | SC2000Decrypt | possible using 12 bits |
| | ...0001 000000000011... | CamelliaDecrypt | |
| | ...0001 000000000100... | Xxxx | |
| | ...0001 000000000101... | Xxxx | |
| | ...0001 000000000110... | Xxxx | |
| | ...0001 000000000111... | Xxxx | |
| | ...0001 000000001000... | Xxxx | |
| | ...0001 00000000xxxx... | Xxxx | |
| | ...0001 00000000xxxx... | Xxxx | |
| | ...0001 100000000000... | Reserved | Reserved for |
| | ...0001 100000000001... | Reserved | future/ |
| | | | proprietary tools |
| Digital watermarking tool | ...0010 000000000000... | Watermarking tool 1 | 4096 different tools |
| | ...0010 000000000001... | Watermarking tool 2 | are possible using 12 bits |
| | ...0010 000000000010... | Watermarking tool 3 | |
| | ...0010 000000000011... | Xxxx | |
| | ...0010 000000000100... | Xxxx | |
| | ...0010 00000000xxxx... | | |
| | | Reserved | Reserved for |
| | | Reserved | future/ |
| | | | proprietary |
| | | | tools |

Note:
The first 4 bits are the tool type ID.

This table should be preloaded to the terminal, or the terminal should be built based on the standard tool ID table shown above.

The location identifier implies a transfer mechanism, and there can be two or more location identifiers for one IPMP Tool. The IPMP Tool Manager attempts to find the tool using each of the identifiers. If the first location identifier of IPMP Tool A is successful, the next location identifier is skipped; if not successful, the second location identifier is tried.

For example, the location identifiers are written as follows.
1. Local: inside of or a peripheral device of the terminal system
2. External: external to the specified terminal system (http:, ftp:)

The IPMP Tool identifier is composed of two parts (location type and location details). The location type must be one of the following. The correlation between the location type and location details is shown in Table 2.

TABLE 2

Possible location types and related details

| Location type ID | Location type | Details |
|---|---|---|
| 0000 | Local | N/A |
| 0001 | Peripheral device | N/A |
| 0010 | Remote downloadable | Website(http, ftp . . .) |
| 0011 | Not remote downloadable | Remote location of Java servelet, e.g. |
| 0100 | In content stream | This part should contain the IPMP tool. |
| . | . | . |
| . | . | . |
| . | . | . |
| 1*** | Reserved | Reserved |

The tool format ID is sent together with the IPMP Tool ID and tool location ID, and uses 8 bits as described in Table 3.

The IPMP terminal knows the binary format of the provided IPMP Tool from the DLL, JBC, or other binary format of the tool format ID, and the IPMP terminal can therefore download or search for a tool in the format appropriate to the OS.

TABLE 3

Format IDs for downloaded IPMP Tools

| 8 bit | Download format | Compatible platform | Compiler | IPMP terminal |
|---|---|---|---|---|
| 00000000 | JBC (Java byte code) | Machine with embedded JVM interpreter | Java compiler | Most cell phones and STBs |
| 00000001 | DLL1 | Windows machines | Microsoft C compiler | All Windows PCs |
| 00000010 | DLL2 | Unix machine | gcc and other compilers | All Unix, Linux OS terminals |
| 00000011 Reserved | DLL-AM33 | Panasonic chip | AM33 compiler | Reserved for chip-dependent manufacture, requires specific compiler |

TABLE 3-continued

Format IDs for downloaded IPMP Tools

| 8 bit | Download format | Compatible platform | Compiler | IPMP terminal |
|---|---|---|---|---|
| Reserved | | | | |
| Reserved | | | | |
| Reserved | | | | |

The reasons for defining the tool format ID of the downloaded IPMP Tool and achieving terminal interoperability are as follow.
1. Most recent cell phones and DTV STBs are built on a Java Virtual Machine (JVM), and IPMP Tools can be compiled into the Java byte code and downloaded to the terminal either in the stream or from a URL.
2. DLL is an extremely common format used on PCs and Unix machines. Using flags of different bit length, the user terminal knows which DLL format to download.
3. For other terminals that do not have either a JVM or C/C++ compiler, the IPMP Tool can be precompiled using such a compiler and downloaded to a particular DTV STB, for example, using the broadcast stream or background channel. This is what is done with current DTV STBs when the broadcaster or manufacturer wants to change the software.

In this case both the broadcaster and manufacturer select and reference the same reserved bit flag in the above tables and notify the DTV STB which IPMP Tool Formats can be searched and used.

The syntax of the IPMP Tool List is defined as follows.

[Equation 1]

```
class IPMP_Tool_List
{
    bit(128)    IPMP_Tool_ID;
    //whether this IPMP Tool is a parametric tool or normal
    tool is implicitly
    // indicated by the IPMP_Tool_ID.
    if (parametricRepresentation)
    {
        //... detailed syntax of parametric representation.
    }
    else
    {
    bit(1) hasAlternativeToolLocation;
    while (hasAlternativeToolLocation)
    {
        bit(1) hasAlternativeToolLocation;
        bit(7) Tool_Location_ID;
        if (Tool_Location_ID == 0b0000000) //tool carried in bitstream.
        {
        }
        else if (Tool_Location_ID == 0b0000001) //remote method call
        {
    bit(8) Remote_Call_Mechanism; //CORBA, DCOM, RMI, //SOAP ...
            bit(1) Client_In_Bitstream;
    }
        else if (Tool_Location_ID ==
        0b0000010 || Tool_Location_ID=0b0000011)
    // Remote Downloadable, http protocol or ftp protocol
        {
            bit(8) Tool_Format_ID;
            unsigned int(16) serverAddressLen;
            bit(8) serverAddress[serverLen];
            unsigned int(16) fullPathLen;
            bit(8) fullPath[fullPathLen];
            bit(1) isCompressed;
            if (isCompressed)
            {
```

-continued

[Equation 1]

```
        bit(7) compressionMethod;
      }
    }
    else if (Tool_Location_ID == 0b0000100 .. 0b1000000)
    //ISO reserved
    {
    }
    else // user defined.
    {
    }
  }
}
}
```

Meaning $IPMP_{13}$ $Tool_{13}$ ID uniquely defines the tool at the universal level. The first 16 bits identify the type category of the particular IPMP Tool, and the next 112 bits identify the IPMP Tool in detail. $IPMP_{13}$ $Tool_{13}$ ID is described in the table below. The registration authority is responsible for maintaining the table.

A number of normally used IPMP Tools must be standardized, a table containing the basic IPMP Tools must be defined, and the table should be preloaded to all IPMP terminals. The following table describes this idea. The content of the basic tools to be standardized is to be considered by the IPMP Committee.

$Tool_{13}$ $Location_{13}$ ID denotes the transfer mechanism, and indicates whether the tool is stored in the content stream, must be downloaded from a remote location, or whether the IPMP Tool can be executed at a remote location.

One IPMP Tool can have two or more location identifiers hasAlternativeToolLocation indicates whether the IPMP Tool has another place to search. The IPMP Tool Manager tries to find the tool using each of the identifiers. If the first location identifier of IPMP Tool A is successful, the next location identifier is skipped; if not successful, the second location identifier is tried.

TABLE 4

IPMP Tool Location identifier (IPMP Tool_Location_ID)

| Tool_Location_ID | Location type |
| --- | --- |
| 000 0000 | Tool stored in the content stream |
| 000 0001 | Tool executed at a remote location |
| 000 0010 | Downloaded using the http protocol |
| 000 0011 | Downloaded using the ftp protocol |
| 000 0100 - 100 0000 | ISO reserved |
| 100 0001 - 111 1111 | Reserved |

A $Tool_{13}$ $Location_{13}$ ID of 0b0000000 means that the IPMP Tool is stored in the content stream. In the MPEG-4 data stream the present invention inserts a binary IPMP Tool in the proposed IPMP Tool ES related to the IOD. The detail are described below.

A $Tool_{13}$ $Location_{13}$ ID of 0b0000000 means that the IPMP Tool is executable on the remote terminal side, and the IPMP terminal calls this IPMP Tool through a RPC (remote procedure call). The 8-bit remote call method indicates with which RPC mechanism (for example, CORBA, RMI, $XML_{13}$ RPC, DCOM) the IPMP Tool is compatible. Details about this $Remote_{13}$ $Call_{13}$ Mechanism are defined in the following table. The IPMP Tool Manager checks whether the terminal is compatible with the RPC mechanism.

TABLE 5

IPMP Remote_Call_Mechanism

| Remote_Call_Mechanism | RPC mechanism |
| --- | --- |
| 0000 0000 | DCOM |
| 0000 0001 | RMI |
| 0000 0010 | CORBA |
| 0000 0011 | XML-RPC |
| 0000 0100 | SOAP |
| . | . |
| . | . |
| . | . |
| 0000 1000 -- 1000 0000 | ISO reserved |
| 1000 0001 -- 1111 1111 | Reserved |

If the IPMP Tool is remotely executed, the IPMP terminal requires lightweight code like a client that communicates by interfacing with a remote IPMP Tool. For example, if the remote IPMP Tool can only be called through CORBA, the IPMP terminal requires a stub that knows the method for sending the parameters appropriate to the remote IPMP Tool in a batch via IIOP (Internet Inter-ORB Protocol) The present invention invokes this lightweight binary code as an IPMP Tool client. This is possible because the IPMP Tool client is considered lightweight and can be contained in the content stream. A method for storing this IPMP Tool client in the content stream is described later.

Simply having an IPMP Tool client that communicates with a remotely executed IPMP Tool is not enough to enable the IPMP terminal to use this remote IPMP Tool. The IPMP terminal needs a way to initialize the IPMP Tool client and talk to the client. A method for handling this is outside the scope of this invention. In this respect the IPMP Tool client can be seen in the same way as other normal IPMP Tools. Therefore, the IPMP Tool should be initialized and called precisely the same way as other IPMP Tools. For example, the IPMP Tool client and IPMP terminal interface definition could be contained in the IPMP descriptor between the OD or ESD that this IPMP Tool client runs.

A $Tool_{13}$ $Location_{13}$ ID of 0b0000010 means that the IPMP Tool Manager must download a specific IPMP Tool using the http protocol. 0b0000011 means that the ftp protocol should be used. ServerAddress (such as www.panasonic.com) and fullpath (such as /ipmptools/encryption/tool1.zip) clearly define the location where this specific IPMP Tool will be found. The method whereby the IPMP Tool Manager finds the required IPMP Tool via the http or ftp protocol is an applied topic of the present invention. There may also be multiple protocol types (https, ssl) that could be used to search for the specific IPMP Tool. The ISO reserved bit range 0000100 to 1000000 is designed to store multiple protocol types.

If the IPMP Tool provider wants to use a proprietary protocol, bit range 1000001 to 1111111 can be used.

The IsCompressed bit sets a flag indicating whether the specified tool is compressed. If compressed, the IPMP Tool Manager must expand the tool according to the compressed method denoted in the compressionMethod field. Numerous compression methods for PCs are available, including PKZip, LHArc, ARJ, and ZOO. For the Macintosh there are StuffIt, CompactPro, and others. Multiple compression methods can be used with IPMP, and one compression method can be declared as the default. $IPMP_{13}$ ToolES The present invention stores a binary IPMP Tool (including the above-described IPMP Tool client) between elementary streams in MPEG-4 System data. To achieve this object the present invention defines a new stream type in the decoder configuration descriptor associated with the elementary stream.

The stream type IPMPToolStream is proposed as follows. Because 0x0A to 0x1F are reserved for ISO use, the value allocated to this stream type is set to 0x0A. The stream type table defined in the current version of the MPEG-4 System specification is therefore changed as shown below.

TABLE 6

IPMP Remote_Call_Mechanism

| Stream type value | Stream type descriptor |
|---|---|
| 0x00 | Prohibited |
| 0x01 | ObjectDescriptorStream (see ISO/IEC 14496-1) |
| 0x02 | ClockReferenceStream (see ISO/IEC 14496-1) |
| 0x03 | SceneDescriptionStream (see ISO/IEC 14496-1 |
| 0x04 | VisualStream |
| 0x05 | AudioStream |
| 0x06 | MPEG7Stream |
| 0x07 | IPMPStream (see ISO/IEC 14496-1) |
| 0x08 | ObjectContentInfoStream (see ISO/IEC 14496-1) |
| 0x09 | MPEGJStream |
| 0x0A | IPMPToolStream |
| 0x0B–0x1F | Reserved for ISO use |
| 0x20–0x3F | For user use |

The decoder for decoding the above IPMPToolStream is the IPMP Tool Manager. When referencing the stream type of 0x0A, the IPMP terminal passes the elementary stream to the IPMP Tool Manager doing the parsing. IPMPToolStream is normally located in the initial object descriptor OD. $IPMP_{13}$ ToolES syntax

[equation 2]
```
class IPMP_ToolES
{
  IPMP_Tool ipmp_tools[0 .. 255];
}
class IPMP_Tool
{
  bit(128)   IPMP_Tool_ID;
  bit(8) Tool_Format_ID;
  bit(1) isCompressed;
  if (isCompressed)
  {
    bit(7) compressionMethod;
  }
  bit(1) isSigned;
  if (isSigned)
  {
    bit(8) signature_Algorithm[];
    bit(8) signature_Parameters[];
    bit(1) IPMP_Tool_List_Signature[];
  }
  bit(16) Tool_Size;
  bit(Tool_Size) Tool_Body;
}
```

$IPMP_{13}$ ToolES Meaning $IPMP_{13}$ $Tool_{13}$ ID and $Tool_{13}$ $Format_{13}$ ID have the same meaning as the content defined above.

$IPMP_{13}$ Tool held in the elementary stream can be signed using a specific signing algorithm for assuring the integrity of $IPMP_{13}$ Tool.

After confirming the signature, the IPMP Tool Manager stores $Tool_{13}$ Body of a size specified by $Tool_{13}$ Size to hard disk or physical memory. The terminal or message router recognizes this.

An IPMP Tool that can be stored in IPMPToolStream includes the proposed IPMP Tool client. After searching from the elementary stream or initialization by the IPMP terminal, the IPMP Tool client talks with the remote IPMP Tool. From the terminal's perspective, however, the IPMP Tool client is not particularly different from a normal IPMP Tool having a unique $IPMP_{13}$ $Tool_{13}$ ID.

1.3 IPMP Tool Manager

The IPMP Tool Manager can be located before or after the system demultiplexer. Its function is to parse the IPMP Tool List in the content stream.

Figure 4:
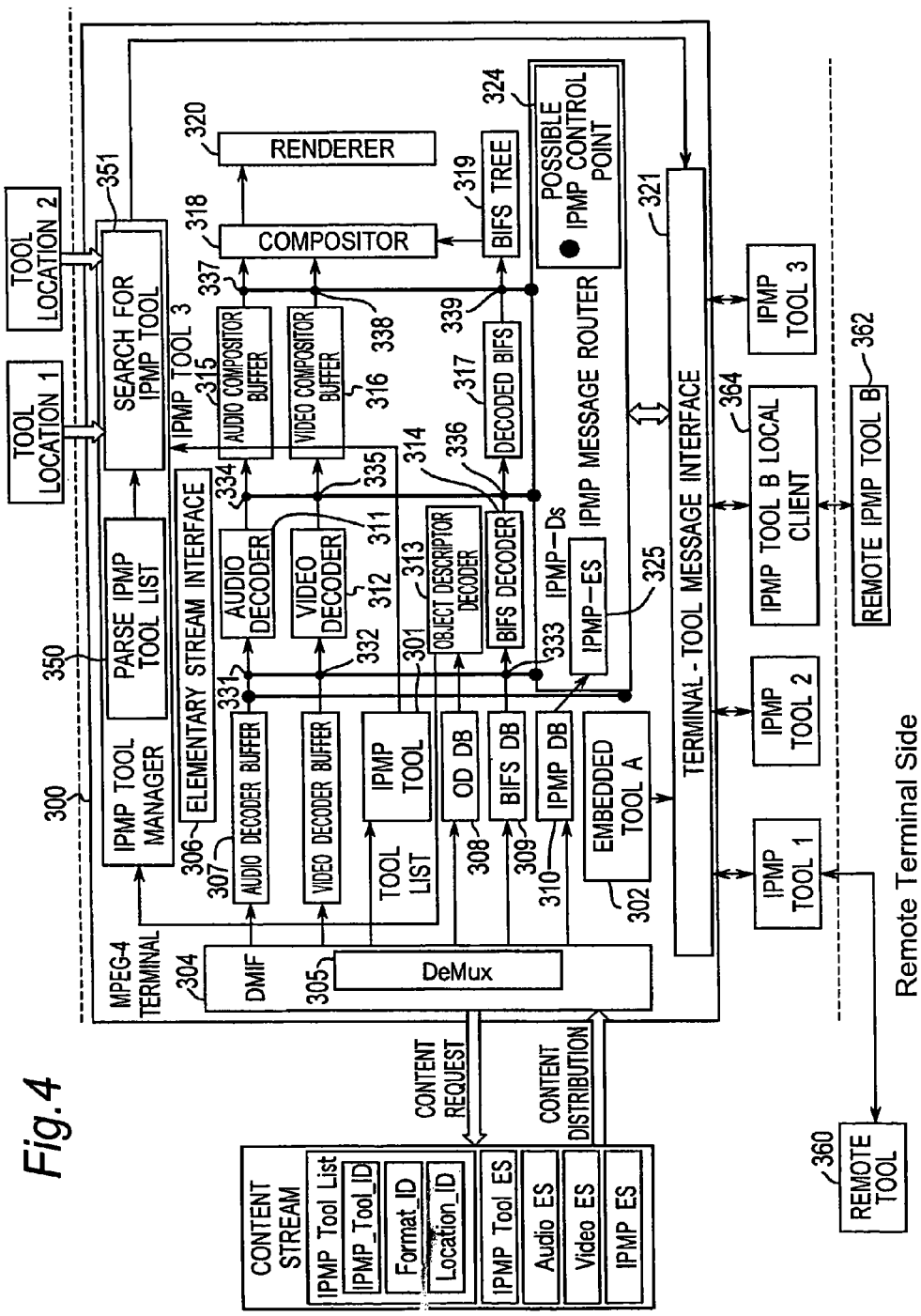
FIG. 4 shows the configuration of an IPMP Tool Manager that operates in conjunction with the MPEG-4 IPMP System.

The diagram shown in FIG. 4 shows an example of an IPMP Tool Manager embedded in the MPEG-4 IPMP System.

The IPMP Tool Manager executes the next four steps.

Step 1: The input IPMP data is parsed to obtain the IPMP Tool List. If there is no list, operation skips to step 4, otherwise the IPMP Tool Information in the IPMP Tool List is parsed according to the normal syntax.

Step 2: If all requested IPMP Tools can be obtained by the terminal, operation skips to step 4.

Step 3: The IPMP Tool Manager looks for the required IPMP Tool specified by the IPMP Tool Information. If the search is successful, operation stops; otherwise, operation advances to step 4.

Step 4: If access is permitted after all IPMP Tools are acquired, the usable content can start to flow into the data buffer.

When receiving a content stream the IPMP Tool Manager first checks the content stream by looking for the IPMP Tool List packet flag, i.e., a uniform header relating to all content streams. If this flag of the IPMP Tool Information packet is not found, operation jumps to step 4.

In step 3 the IPMP Tool Manager tries to find each IPMP Tool by checking the location identifier type ID and location identifier details. If there are two or more location identifiers corresponding to one IPMP Tool, the IPMP Tool Manager first tries to find the IPMP Tool using location identifier 1, and if that fails tries searching with the next location identifier 2.

If the location identifier type is "local," the IPMP Tool Manager looks in the local terminal using the specified IPMP Tool name or IPMP Tool ID.

If the location identifier type is "peripheral device," the IPMP Tool Manager searches all peripheral devices according to the specified IPMP Tool name or IPMP Tool ID.

If the location identifier type is "remote downloadable," the IPMP Tool Manager connects to the specified remote address, and if necessary sets up a two-way communication channel between the IPMP Tool Manager and tool provider.

If the location identifier type is "not remote downloadable," the IPMP Tool Manager simply passes the remote address to the IPMP System.

If the location identifier type is "in content stream," the IPMP Tool Manager loads the tool in a binary format compatible with the terminal by checking the Tool format ID, and assigns the IPMP Tool ID to the tool entity stored as the tool descriptor.

After the demultiplexer interface 304 are an audio decoder buffer 306, video decoder buffer 307, IPMP Tool decoder buffer 301, object descriptor decoder buffer 308, Binary Format for Scenes (BIFS) decoder buffer 309, and,IPMP decoder buffer 310. The Binary Format for Scenes includes data indicating the location of segmented scenes. The audio signal, video signal, and BIFS signal output from 306, 307, and 309 are encrypted. Tool A (single or plural) is pre-installed in memory 302 of each terminal.

The audio decoder buffer 306 is connected to audio decoder 311 through control point 331, the video decoder buffer 307 is connected to video decoder 312 through control point 332, the object descriptor decoder buffer 308 is connected directly to the object descriptor decoder 313, and the Binary Format for Scenes (BIFS) decoder buffer 309 is connected to BIFS decoder 314 through control point 333. The IPMP decoder buffer 310 is connected to the IPMP elementary stream 325 of IPMP message router 324. An encrypted scrambled key is stored in the IPMP elementary stream 325.

In the figure the control points 331 to 339 indicated with a black dot are IPMP control points, and data passing the control points is processed as necessary (for descrambling, watermark detection, copyguard, etc.) using tools in the IPMP System 324.

In this embodiment of the invention descrambling is applied at control points 331, 332, 333. Tools (software) needed for descrambling are obtained from IPMP Tools 1, 2, or 3 through the IPMP message router 324 and terminal-tool message interface 321.

The audio decoder 311 is connected to audio compositor buffer 315 through control point 334, video decoder 312 is connected to video compositor buffer 316 through control point 335, and BIFS decoder 314 is connected to decoded BIFS 317 through control point 336.

Watermark detection is done at control points 334, 335, 336. The tools (software) needed for watermark detection are obtained from IPMP Tools 1, 2, or 3 through IPMP message router 324 and terminal-tool message interface 321. For example, IPMP Tool 2 stores the tool needed for descrambling, and IPMP Tool 3 stores the tool needed for watermark detection.

The audio compositor buffer 315 is connected to the compositor 318 through control point 337, video compositor buffer 316 is connected to compositor 318 through control point 338, and decoded BIFS 317 is connected to compositor 318 through control point 339 and BIFS tree 319. The compositor 318 is further connected to the output renderer 320.

A separate watermark detection and copyguard protection are applied at control points 337, 338, 339. The tools (software) required for watermark detection and copyguard processing are obtained from IPMP Tools 1, 2, or 3 through IPMP message router 324 and terminal-tool message interface 321.

The IPMP Tool Manager 300 has a parsing unit 350 for parsing the IPMP Tool List, and a search unit 351 for finding the IPMP Tool. The object descriptor decoder buffer 308 is connected directly to the object descriptor decoder 313 for decoding object descriptors included in the content stream. The decoded object descriptors are passed to the IPMP Tool Manager 300, the location of the required tool is identified, and the data for getting that tool is sent from the IPMP Tool Manager 300 to the tool message interface 321. If the identified tool is in memory 302, the tool message interface 321 moves the tool to IPMP Tool 2 or 3, and runs the required process. If the identified tool is not in memory 302, remote tool 360 is accessed via the Internet or other communication path, and the required tool is downloaded to IPMP Tool 1. If the required tool is only available at remote IPMP Tool B 362 and cannot be downloaded, the encrypted data is sent as is to the remote IPMP Tool B 362 via local client 364 of IPMP Tool B, and the data decrypted by the remote IPMP Tool B 362 is returned.

Figure 5:
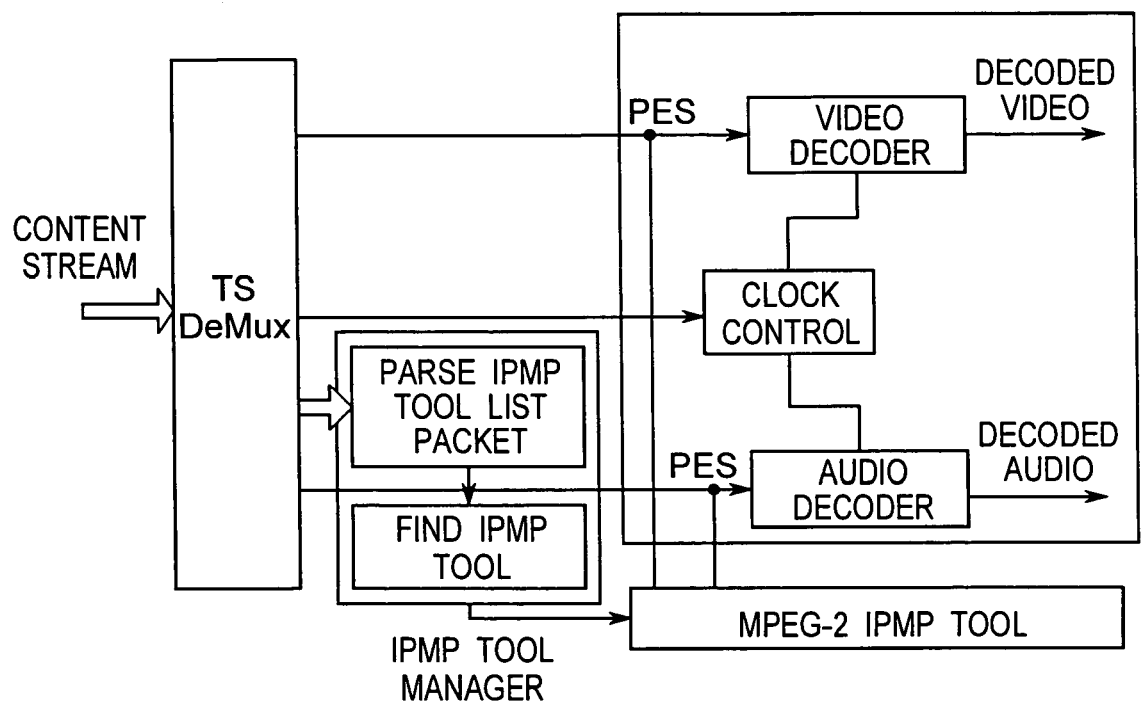
FIG. 5 shows the configuration of an IPMP Tool Manager that-operates in conjunction with an MPEG-2 system.

This architecture including an IPMP Tool Manager and IPMP Tool List can be applied to any MPEG-n System, and FIG. 5 shows an example of the IPMP Tool Manager incorporated in an MPEG-2 IPMP System. The example shown here does not contain any objects. Descrambling and watermark data decryption are applied at the control point indicated by the black dot labelled PES.

The general syntax of an MPEG-n IPMP System can be defined as follows for the same part of the content.

[Equation 3]

```
Class UserAuthentication( )
{
Class ReceivingContentStream( )
{
Class DemuxContent( )
{
  Class IPMPToolsManagement( )
  {
  Class ParseIPMPToolsInformation( ); //IPMP Tool
  Management module, see 2.3 for details;
  Class RetrieveIPMPTools( );      //IPMP Tool
  Management module, see 2.3 for details;
    {
  Class ContentConsumptionStart( );
  }
    }
   }
  }
 }
}
```

2. Output Messages to be Specified for User Rights Authentication

While it is not recommended to standardize the user rights authentication (RA) method, it is necessary to set a reference for or to predefine the authentication result or output messages for rights authentication. The messages must pass the MPEG-n IPMP System for authorized use of protected content.

We propose that authentication output messages should be set as a standard specification, and that the standard should be composed of at least three fields as shown below.

TABLE 7

| Validity (TRUE/FALSE) | License | Usage Rules | Reserved |
|---|---|---|---|

The syntax of the user rights authentication (RA) function is as listed below.

[Equation 4]

```
Class RightAuthenticationMessages( )
{
  bit(1) Valid;
  if(valid)
  {
    Class RetrieveLicence( );
    Bit(16) Licence;
    Class UsageRule( );
    Bit(length) UsageRule;
  }
}
```

Validity indicates whether the user (terminal) is authentic or not, and the result can be a simple true or false indication.

The usage rules should include details (such as play once or play multiple times) about the user right to access content. The license is described below.

As indicated in the IPMP data (such as the IPMP$_{13}$ ES of MPEG-4 IPMP), the content is known to be scrambled with the scrambling key transmitted in the content stream. For example, an encrypted scrambling key is in the IPMP$_{13}$ ES. To assure even greater security, the scrambling key can be encrypted to achieve two-layer security. The second layer key used to decrypt the scrambling key for the scrambled content is called the "license." A license is the minimum condition for consuming protected content. A license should be retrieved from a license server over a secure channel during a non-standard user authentication process.

The above authentication output message should be provided and output during user authentication regardless of what type of user authentication method the IPMP terminal uses.

These usage rules can be further defined in Table 4 relating to the consumption types and binary formats for rules. Alternatively, the usage rules can be defined in XML format for interactivity rather than in binary format.

TABLE 8

Consumption types and rules defined in binary format

| Consumption type | 8-bits | Consumption rule type 4 bits + variable | Notes |
|---|---|---|---|
| Access | 00000000 | | Access content |
| Play (streaming) | 00000001 | | Streaming playback |
| Store and play | 00000010 | | Store and play |
| | | 0001 + playback count | |
| | | 0010 + playback time | |
| | | 0011 + playback interval | |
| | | 0100 + number of copies | |
| | | 0101 + number of moves | |
| | | Reserved | |
| Edit scene graph | 00000011 | | |
| Edit timeline | 00000100 | | |
| Text or other addition | | | |
| | | Reserved | |

Figure 6:
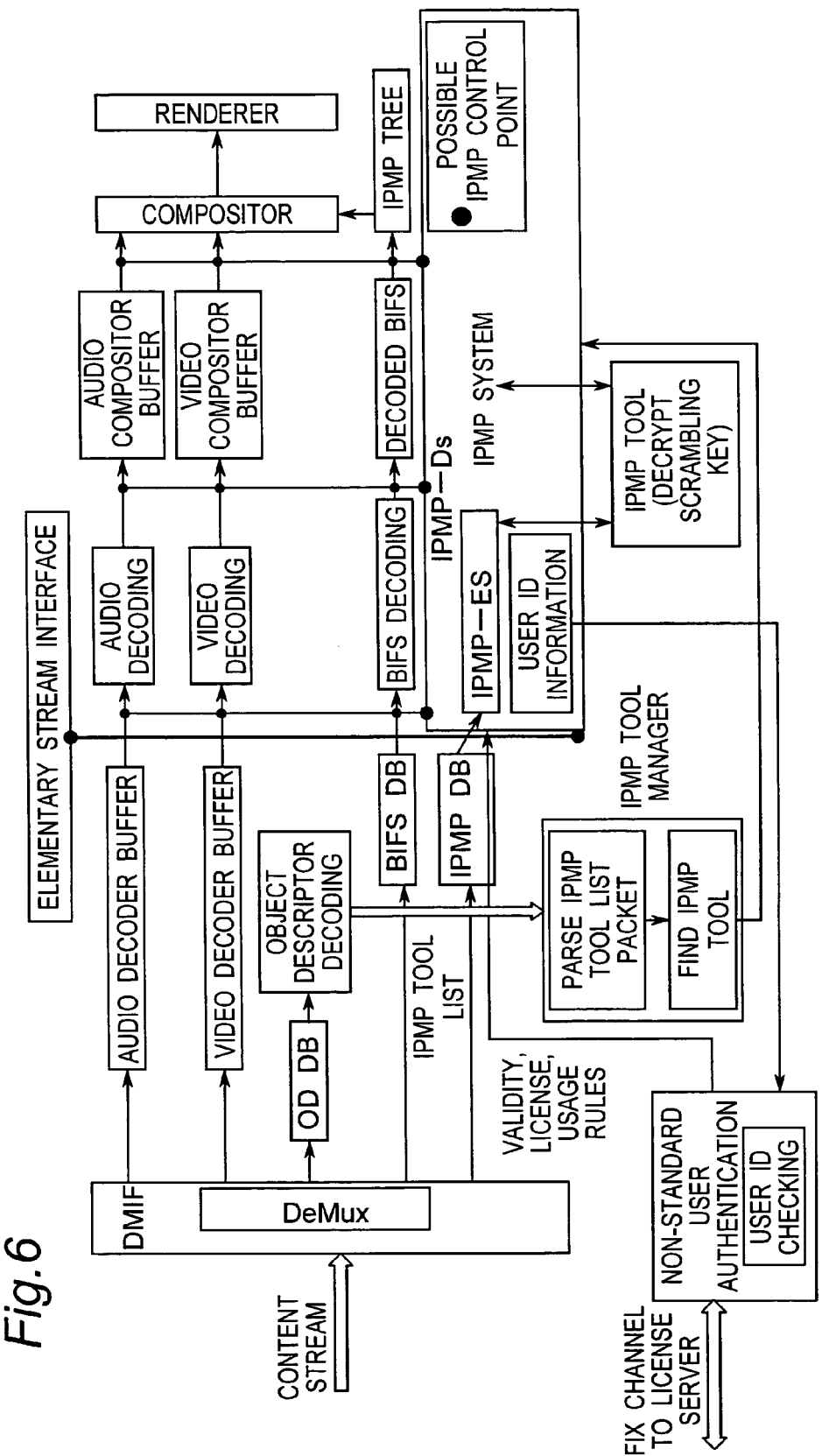
FIG. 6 shows the configuration of a user authentication module that operates in conjunction with an MPEG-4 IPMP System and IPMP Tool Manager module.

The diagram shown in FIG. 6 shows a user authentication module that operates in conjunction with an MPEG-4 IPMP System, requests a content agent after user authentication, and issues a license to the user. The user ID information is contained in the IPMP System. The user ID is checked during user authentication when this user ID information is not standardly defined. A random number, for example, is used for this check. If the check is validated, the user is registered in the server as a valid user.

Figure 7:
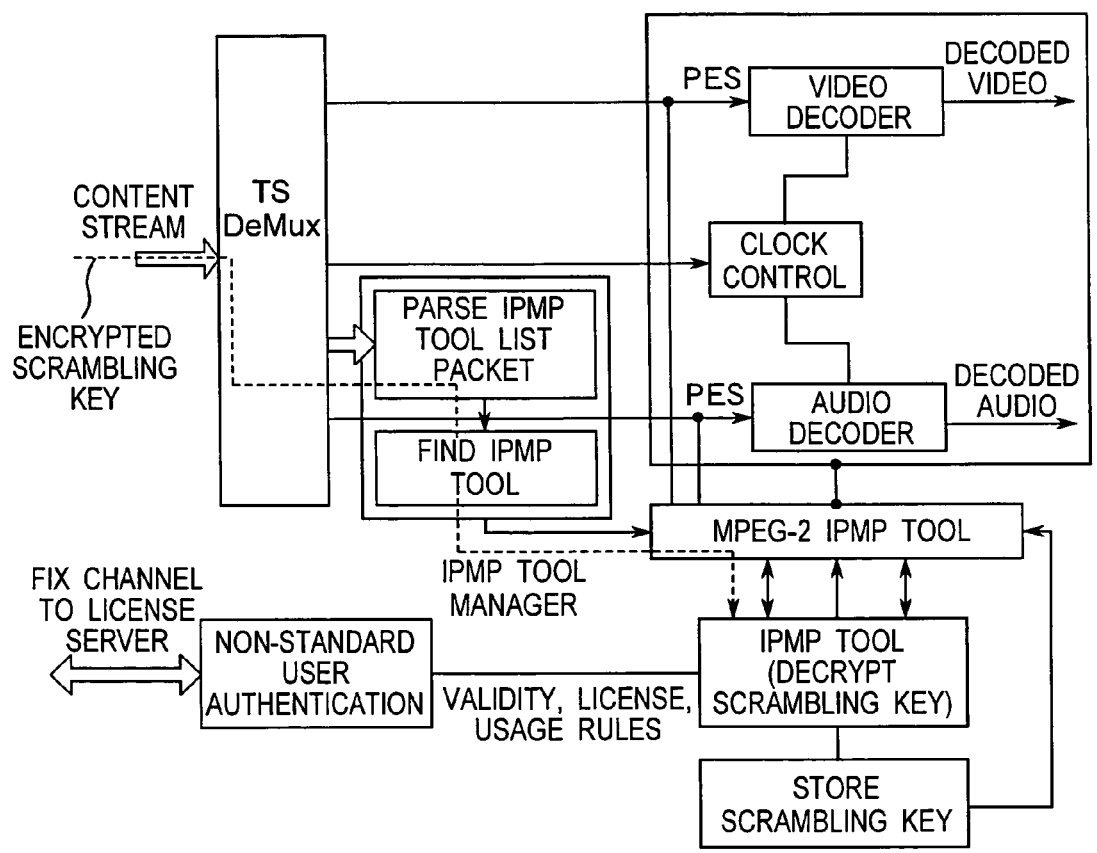
FIG. 7 shows the configuration of a user authentication module that operates in conjunction with an MPEG-2 system and IPMP Tool Manager module.

As shown in the diagram in FIG. 7, a two-layer security structure can be achieved for MPEG-n IPMP. A license key received from the server is sent to the IPMP Tool memory. An encrypted scrambling key contained in the content stream is sent to the IPMP Tool memory through the path indicated by the broken line. The scrambling key is then decrypted using the license key in the IPMP Tool memory. The decrypted scrambling key is stored in the scrambling key memory and used for IPMP Tool operation. The IPMP Tool thus applies redundant security using a scrambling key and license key.

3. A General Interface for IPMP Tools

A general interface can be defined when we set typical application scenarios for using data encryption and decryption, watermarking, and combined watermarking and decryption.

Data Detection Interface

A block-based data encryption/decryption tool is more important and more widely used in proprietary IPMP Systems, and the algorithms in particular are known to have certain types of constraints. It is therefore possible to specify the interface and express most of the data encryption and decryption technique, and the interface is within an expected range even while part of it is unknown.

A NESSIE Interface for a Symmetric Data Encryption/Decryption Algorithm

A general interface for block-based data encryption/decryption of all access units can be defined in the IPMP System. Both the IPMP Tool provider and IPMP Tool terminal implementer can compile the tool to a binary format on the tool provider side according to the same interface, and send the correct binary tool to the IPMP terminal. The interface described below is defined in NESSIE (New European Schemes for Signature, Integrity, and Encryption) and can be made compliant with the above interface we defined for block-based data encryption/decryption. This interface is as shown below, and is composed of three types: NESSIEkeysetup( ), NESSIEencrypt( ), and NESSIEdecrypt( ).

void NESSIEkeysetup(const unsigned char * const key, struct NESSIEstruct * const structpointer);

void NESSIEencrypt(const struct NESSIEstruct * const structpointer, const unsigned char * const plaintext, unsigned char * const ciphertext);

void NESSIEdeczyt(const struct NESSIEstruct * const structpointer, const unsigned char * const ciphertext, unsigned char * const plaintext);

Watermarking Interface

There are four major reasons for using watermarking:

copyright protection, to determine the true ownership of media data;

tracing illegal copies, to monitor and pursue illegally manufactured copies;

copy protection, to prohibit unauthorized copying of m media;

image authentication, to detect data modification.

The following is known by analyzing each of these areas. In the case of copyright protection the watermark is embedded at the encoding side and is detected off-line. In this case real-time detection at the IPMP terminal is not needed in conjunction with other real-time decryption and decoding modules.

A rights authentication tool can provide significantly more complicated usage rules than can using a watermark for copy protection, and can therefore handle copy protection better.

When using a watermark controlling content encryption and decryption the watermark detector must be specified and implemented at the IPMP terminal.

A general interface for watermark detection can be specified for a compliant IPMP terminal as described below regardless of the algorithm used for watermark copy control embedding and detection.

PSL watermark detection (Unsigned Char* Input, Unsigned Char* WatermarkInfor)

Because copy control detection is applied after copy control is embedded at the content provider/distributor side, encrypted, and decoded, it is necessary to enable using different watermark detection methods in the IPMP terminal by specifying and implementing the above interface on the IPMP terminal.

Image authentication is the same as copyright protection in this case, and can be done off-line.

For tracing illegal copies watermark embedding whereby a user ID or terminal ID is embedded for the purpose of content tracing is an excellent function that has been widely proposed and used in other systems. Using watermark embedding is proposed here as a basic feature to further protect against illegally copying content by storage in the IPMP System or playback applications. In the IPMP System protection is first accomplished through data encryption/decryption as is well known, and tracing illegal copies is done through watermark embedding.

Regardless of the technique used in the spatial domain or frequency domain for watermark embedding, and regardless of the field in which it is used, either video or audio, the input message and output message should be the same as follows.
PSLWatermarkEmbedding (Unsigned Char* Input, Unsigned Char* WatermarkInfor, Unsigned Char* Output)

Watermark detection can be done off-line in this case.

What type of algorithm is used for user ID or terminal ID watermark embedding is the responsibility of the IPMP terminal implementer. In this case it is not even necessary to specify the above interface in the IPMP System insofar as the conditions are set for the IPMP System requiring a compliant IPMP terminal to execute the watermark embedding function, embed an ID or terminal ID, and trace illegal copies.

The conclusion regarding independent embedding used at an IPMP terminal is that a general interface is defined only for copy control detection using digital watermarking.
Combined Watermark Detection and Data Decryption A decryption key embedded in the content is an excellent method for protecting content by processing the key itself. In such cases two interfaces can be defined as follows.
PSLWatermarkExtraction(Unsigned Char* Input, Unsigned Char* Key)
PSLDecryption(Unsigned Char* Input, Unsigned Char* Key, Unsigned Char* Output)

Processing is described below.

Content decoding for authentication->key extraction->next authentication decryption using the key extracted in the previous authentication, executable using a looping rule.
4. Partial Data Decryption FIG. 8 shows that data encryption and decryption can be selectively applied bit by bit instead of to the entire bitstream.

Figure 8A:
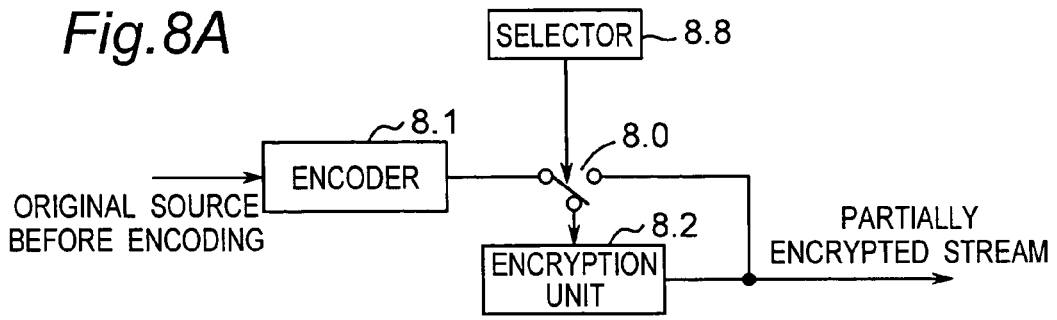
FIG. 8(*a*) shows the configuration of partial encryption with an encoder.
Figure 8B:
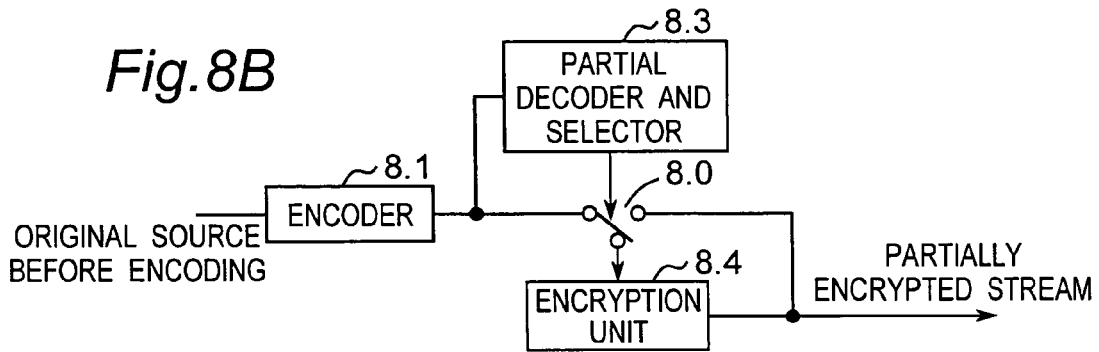
Figure 8C:
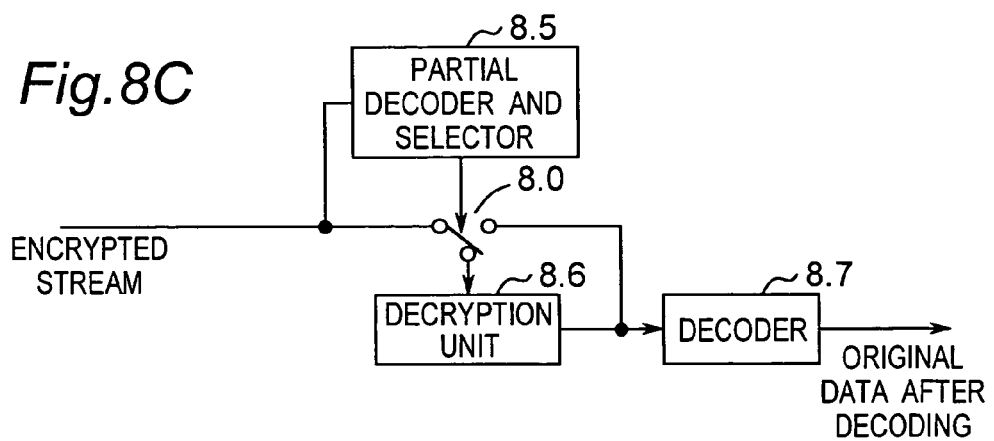

FIG. 8(*a*) shows partial encryption with an encoder, and describes selectively encrypting important bits during the content provider-side encoding process.

In FIG. 8(*a*) module 8.1 is an encoder for encoding an audio, video, or other original input source to a stream according to MPEG-2 or MPEG-4, for example. In module 8.2 the selected bits or information are encrypted to protect the content because those bits or information are essential or important to the other bits. Reference numeral 8.0 is a switch, and 8.8 is a selector for switching switch 8.0. In FIG. 8(*a*) selector 8.8 outputs a switching signal at a predetermined cycle or time division. Encoder output is therefore encrypted during the determined time division, and is not encrypted at other times.

FIG. 8(*b*) shows an example of selectively encrypting important bits in the data encoded by the encoder. It should be noted that encoder 8.1 is applicable both in the content distributor and separately from the content distributor. In the latter case the content distributor receives and distributes an encoded stream. This applies when the content distributor wants to protect encoded content using existing or proprietary encryption tools.

In FIG. 8(*b*) module 8.3 is a partial decoder having a selector for parsing and selecting important bits for encryption in module 8.4. The encoded stream is sent directly to switch 8.0 and to the partial decoder and selector 8.3. The partial decoder and selector 8.3 decodes the encoded data and detects the important parts, such as the I-picture or P-picture parts in the case of a video signal. When the important data parts are detected, it operates the switch 8.0 so that the segment of the encoded stream corresponding to that important data part is sent to the encryption unit 8.4. A delay can therefore be provided as required between the switch 8.0 and the branching point from the encoder 8.1. The partial decoder and selector 8.3 could decode the input encoded signal in part, or decode the entire signal.

FIG. 8(*c*) shows the decoder-side configuration. Partial decryption is shown here. An embodiment selectively decrypting a partially encrypted stream occurring at the IPMP terminal side is shown.

In FIG. 8(*c*) module 8.5 is a partial decoder with a detector for parsing and detecting bits to be decrypted by module 8.6. At the same time the decoded audio or video is output from module 8.7. The detector 8.5 detects parts that cannot be decoded and parts that can be decoded by attempting decoding. The stream equivalent to the non-decodable parts is known to be an encrypted segment, and the encrypted segments are thus detected. The encrypted segments of the stream are sent to the decryption unit 8.6 and decrypted.
5. Profiles Possible for an IPMP System Different applications, different terminals, and different vendors have different requirements for IPMP Systems, and it is difficult to handle all systems with a single standard. This problem basically depends on whether the IPMP Tool is preloaded or downloadable. In most cases for simple hardware implementations, including new platforms for set-top boxes capable of downloading a particular tool and mobile devices, most tools are preloaded or built in because a Java virtual machine is often provided.

When an implementation with little complexity is required the mobile or portable terminal needs to have a pre-encoded IPMP Tool. PC applications are extremely flexible and tools can be downloadable or pre-encoded.

When the IPMP Tool can be downloaded the interface of the downloaded IPMP Tool must also be defined. The message interface is an excellent solution for providing an extremely flexible structure to an IPMP terminal for processing unknown or dedicated IPMP Tools, but requires a more complex package for the IPMP terminal.

If three profiles are specified, three cases can be handled based on the terminal functions as shown in Table 5. These three profiles are: a simple profile for fixed IPMP Tools, a core profile for flexible IPMP Tools and a fixed interface, and a high profile for flexible IPMP Tools and a flexible interface.

TABLE 9

Three profiles for different terminals

| Profile | IPMP Tool acquisition | |
|---|---|---|
| | pre-encoded | previously downloaded |
| Simple profile Fixed IPMP tools | done | NA |

TABLE 9-continued

Three profiles for different terminals

| Profile | IPMP Tool acquisition | |
|---|---|---|
| | pre-encoded | previously downloaded |
| Core profile flexible IPMP Tools and a fixed interface | done | done |
| High profile flexible IPMP Tools and a flexible interface | done | Done, can support more tools |

When the tools are fixed, the recommended IPMP Tool type must be defined by a standard method and the manufacturer must be able to load the tool into the terminal. In this case the interface is determined by the IPMP terminal implementer.

If the tool is not fixed but the interface is, it is necessary to specify a number of general interfaces relating to different IPMP Tools using a standard method.

If neither the tool nor the interface is fixed, it is necessary to specify the message interface in detail and report operation by a standard method.

This invention solves the problem of playing the same protected content by different IPMP Systems by incorporating an IPMP Tool Manager module for parsing an IPMP Tool List and getting the IPMP Tool and reading an IPMP Tool List packet before the content stream. IPMP Tools in different formats can be downloaded and matched to the IPMP terminal by specifying an IPMP Tool Format ID. In addition, this invention also specifies a general tool interface for three important IPMP Tools and completes the IPMP System.

A two-layer structure not only provides greater security, it also fixes the output structure for different user authentication methods and provides terminal compatibility. Different methods can therefore be used by different vendors for user authentication with this structure, and interoperability can be assured.

Different profiles are defined with consideration for the complexity and flexibility of the terminals acquiring and using IPMP Tools, and enable a single standard to be used while providing wide applicability with respect to different terminals and different IPMP Tool vendors.

Figure 9:
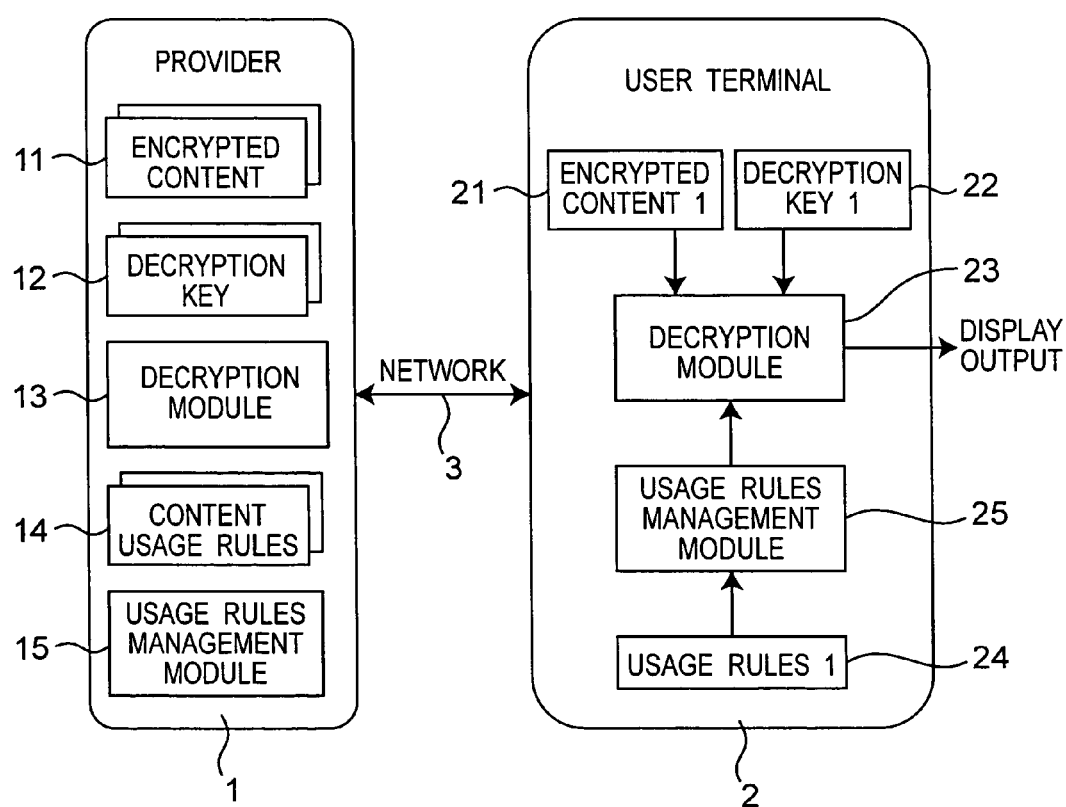
FIG. 9 shows the configuration of an IPMP System according to another embodiment of the invention.

FIG. 9 shows the configuration of a copyright protection system according to anther embodiment of the invention. In FIG. 9 reference numeral 1 is a provider, 2 is a user terminal, 3 is a network connecting the provider 1 and the user terminal 2. The provider 1 has encrypted content 11 and corresponding decryption key 12, a decryption module 13 as one copyright protection tool, content usage rules 14 that are copyright protection information, and a usage rules management module 15 that is one copyright protection rule for managing the usage rules; the user terminal 2 contains nothing in the initial state.

A method is described below for updating the copyright protection system and decrypting and playing encrypted content according to the usage rules in a copyright protection (IPMP) system according to an embodiment of the present invention configured as described above.

Figure 10:
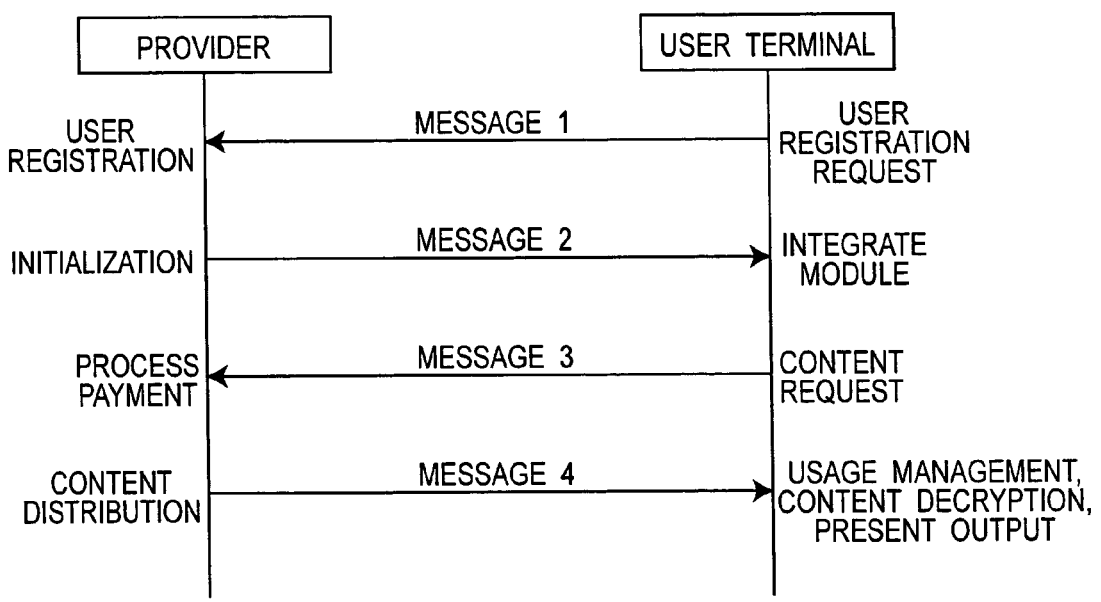
FIG. 10 shows the flow of messages sent from a provider to a user terminal in an IPMP System according to an embodiment of the invention.

FIG. 10 shows the flow of messages exchanged between the provider and user terminal in a copyright protection system in a preferred embodiment of the invention.

FIG. 11 shows specific sample messages where each message is composed of pre-registered message field names shown on the left side of the equal (=) sign, and the value (data) of that message field after the equal (=) sign.

First, the user terminal 2 sends message 1 to the provider to register the user with the provider of the desired content and acquire the necessary copyright protection (IPMP) tool. The message fields of message 1 include the message ID (identifier), user name, payment method, and user terminal information. The value of each message field is as follows. Because the object of message 1 is user registration, the message ID value is a value denoting "user registration," and the value of the user name required for registration is "Matsushita Taro." The value of the method of paying for the desired content is an encrypted "credit card number" including the type of credit card, number, and expiration date. The value of the user terminal information is "Windows OS" because the machine runs under the Windows OS.

This information is further encrypted at the network 3 entry port, and is decrypted at the exit port.

Public key encryption or shared key encryption is used as the encryption method. The specifics of these methods are described, for example, in "Modern Encryption," Okamoto, et al., Sangyo Tosho, 1997 [in Japanese].

The provider receiving message 1 registers the user name and decrypted credit number, assigns user ID "XYZ" to user terminal 2, and returns message 2 to user terminal 2. Because this message 2 contains the information needed for user initialization in order to use the content, the message ID value is "initialization," the message contains the user ID value XYZ, a "content list" of the content available from the provider is included as the IPMP information, and an identifier (decryption module ID) of the decryption module for decrypting the encrypted content and where the decryption module is located (location) are included as IPMP Tool information. So that the content is used according to the usage rules, an identifier (usage rules management module ID) of the usage rules management module and where the module is located (location) are included as IPMP Tool Information. In this example the decryption module and usage rules management module are chosen to be directly installed to the user terminal, a Windows machine. It will be obvious that message 2 and the following messages are encrypted when sent over the network 3.

The user terminal receiving message 2 acquires the decryption module specified by the decryption module ID and location, and the usage rules management module similarly specified by the usage rules management module and location, by such means as file transfer, and internally integrates the copyright protection rules (IPMP rules). This file transfer is also an encrypted file transfer, and because other user terminals do not have the decryption key the module cannot be decrypted even if it is intercepted.

Next, the user terminal 2 selects the desired content 1 to hear from the content list, and sends message 3 to the provider with a content request as the message ID. Message 3 contains the value XYZ as the user ID, and the ID of the requested content 1 as the content information.

After billing the credit card company using the user's credit card number for the price of the requested content 1, the provider 1 receiving message 3 returns message 4 to send the encrypted content 1 to the user terminal 2. Message 4 is composed of the message ID, two copyright protection (IPMP) data, and the content data. The message ID value is "content distribution," and the IPMP information value is usage rule 1 for the requested content 1 and decryption key 1 for decoding the encrypted content 1. The content data is the encrypted requested content 1. Because the decryption key 1 is sent to the user terminal 2 encrypted by a public key encryption method, this encrypted decryption key cannot be decrypted even if message 4 is intercepted by a third party, and content leaks are prevented.

In the user terminal 2 receiving message 4 the previously assembled usage rules management module 25 controls the decryption module 23 while confirming the usage rules 1, and the decryption module 23 uses the decryption key 1 to decrypt encrypted content 1, and presents the decrypted content 1. The decryption module 23 uses a shared key encryption method to decrypt the encrypted content 1 as described in detail in the above-cited reference.

Figure 13:
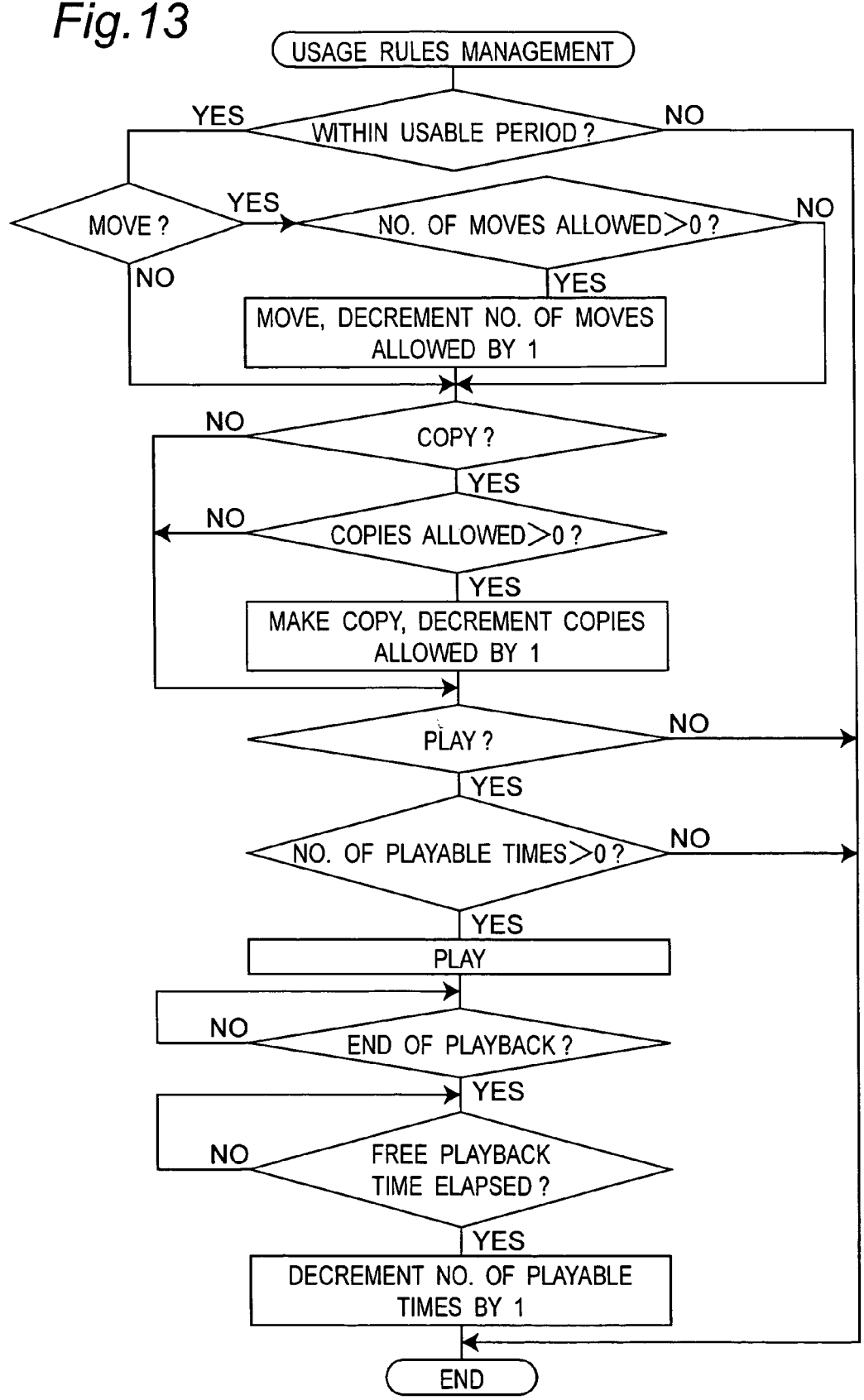
FIG. 13 shows the flow of processing in a usage rule management module.

The operation of the usage rules management module 25 controlling the decryption module 23 for decrypting the encrypted content 1 according to a preferred embodiment of the usage rules 1 shown in FIG. 12 is described next using the flow chart in FIG. 13.

First, the usage rules management module 25 checks the first line of the usage rules 1 and confirms with the clock of the user terminal whether the content is within the usable period; if not, processing ends.

If it is the user is asked to confirm whether to move the content to different memory. If the content is moved, the number of permitted moves is read from the usage rules 1, the content is moved to the user-specified storage if this value is greater than zero, and the number of permitted moves is reduced by 1.

The user is then asked to confirm whether to create a copy of this content. To make a copy the number of permitted copies in the usage rules 1 is checked, and if this value is greater than zero the content and usage rules are copied to the user-specified storage and the number of permitted copies is reduced by 1. To simplify processing the number of permitted copies of the content copy is set to zero, but various other controls could be applied so that the total number of copies does not exceed the allowed number of copies.

The user is then asked whether to play the content. To play the content the allowed playback count in the usage rules 1 is checked, and if this value is greater than zero the decryption module 23 is instructed to decrypt and present the content.

The decryption module 23 receiving this command decrypts the content 1 and presents the result as described above.

Next, the usage rules management module 25 detects when playback ends, detects whether the total playback time to then exceeds the free playback time, and if it has reduces the allowed playback count by 1 and ends processing.

Playback is executed only the number of times intended by the provider 1 as a result of managing the usage rules 1 by the usage rules management module 25 as described above. The number of copies and content moves is also managed as intended by the provider at the same time.

It should be noted that the messages in this embodiment are composed of sets of predetermined message fields and a corresponding value linked by an equal sign (=), but any other message whereby the message values can be known could be used. For example, a method assigning a predetermining meaning to a particular bit position in the message could be used.

With this configuration and method an updateable copyright protection system according to the present invention enables updating the copyright protection module and consuming content according to usage rules supplied by a provider as a result of the user terminal decrypting messages sent from the provider to the user terminal.

In other words, whether or not to update a module can be determined according to whether the module ID is in the message or not, where the module is located can be known from the location value if the module ID is present, and the module can therefore be downloaded.

Furthermore, because the message field names are predetermined, the value of a particular message field can be obtained by finding the message field name, and the message fields and corresponding values in the message can be in any order in the message.

It is also not necessary to install a virtual machine on the user terminal 2 as described above because the provider 1 knows the type of OS run on the user terminal 2 from message 1, and selects and downloads to the user terminal 2 the copyright protection module 1 appropriate to the user terminal 2.

The invention claimed is:

1. A flexible IPMP system configured for providing and protecting content on an IPMP terminal, comprising:
    an IPMP Tool Manager of the IPMP terminal, which includes a parsing unit that parses a content stream including an IPMP Tool List in a header of the content stream, and a search unit that finds an IPMP Tool, wherein the IPMP Tool Manager obtains information related to an IPMP Tool suitable for the IPMP terminal from the parsed of IPMP Tool List; and
    an IPMP Message Router that acquires a designated IPMP Tool from a Terminal-Tool Message Interface based on the IPMP Tool List, wherein the Terminal-Tool Message Interface obtains the designated IPMP Tool from at least one of a local memory in which the designated IPMP Tool is preloaded or pre-encoded, a peripheral device tool location, a remote terminal side tool location, and the content stream,
    wherein the IPMP Tool Manager interprets an IPMP Tool List Flag, content ID, and IPMP Tool List,
    wherein the IPMP Tool List defines IPMP Tool IDs relating to IPMP Tools in a table having a table format, where the table has reservable unused spaces, and part of the IPMP Tool IDs being defined as an IPMP Tool Type,
    wherein the IPMP Tool Manager preloads, pre-encodes or downloads the table to the IPMP terminal,
    wherein at least one of a BIFS decoder, an audio decoder, or a video decoder extracts an IPMP Tool ID from the IPMP Tool List held in the content stream, and the IPMP Tool Manager finds the IPMP Tool by the obtained information related to an IPMP Tool suitable for the IPMP terminal from the parsed IPMP Tool List in the header of the content stream,
    wherein the IPMP Message Router acquires an IPMP Tool Location identifier presented in the IPMP Tool List held in the content stream,
    wherein the IPMP Message Router acquires an IPMP Tool Format ID held in the content stream in conjunction with the IPMP Tool ID, and
    wherein the IPMP Terminal selects the IPMP Tool in an appropriate format to match an IPMP terminal platform.

2. A flexible and shared IPMP system configured for providing and protecting content on an IPMP terminal, comprising:
    an IPMP Terminal that automatically sends a request to a content distributor and authenticates user rights; and
    an IPMP Message Router that receives a license or key information from the content distributor after user rights authentication succeeds and that acquires a designated IPMP Tool based on an IPMP Tool List, wherein a Terminal-Tool Message Interface obtains a designated IPMP Tool from at least one of a local memory in which the designated IPMP Tool is preloaded or pre-encoded, a peripheral device tool location, a remote terminal side tool location, and the content stream;

wherein the IPMP Terminal includes an IPMP Tool Manager which includes a parsing unit that parses a content stream including an IPMP Tool List in a header of the content stream, and a search unit that finds an IPMP Tool, wherein the IPMP Terminal parses the license or key information, wherein the IPMP Tool Manager interprets an IPMP Tool List Flag, content ID, and IPMP Tool List, wherein the IPMP Terminal stores the license or key information in a memory of the IPMP terminal, wherein the IPMP Terminal stores the acquired IPMP Tool with a corresponding part of the IPMP Tool List information in a memory of the IPMP terminal, and wherein at least one of a BIFS decoder, an audio decoder, and a video decoder decrypts and decodes the content stream using the license or key information in conjunction with the IPMP Tool stored in a memory, the IPMP Tool Manager obtaining information related to an IPMP Tool suitable for the IPMP terminal from the parsed IPMP Tool List in a header of the content stream.

3. A flexible and shared IPMP system configured for providing and protecting content on an IPMP terminal, comprising:

an IPMP Terminal that sends a request to a content distributor and authenticates user rights;

an IPMP Message Router that receives a license or key information from the content distributor, that acquires a designated IPMP Tool based on the IPMP Tool List from at least one of a local memory in which the designated IPMP Tool is preloaded or pre-encoded, a peripheral device tool location, a remote terminal side tool location, and the content stream, and that acquires an encryption key used to encrypt content on a content provider side;

wherein the IPMP Terminal includes an IPMP Tool Manager which includes a parsing unit that parses a content stream including an IPMP Tool List in a header of the content stream, and a search unit that finds an IPMP Tool, wherein the IPMP Terminal parses the license or key information, wherein the IPMP Tool Manager interprets an IPMP Tool List Flag, content ID, and IPMP Tool List;

wherein the IPMP Terminal stores the license or key information in a memory of the IPMP terminal; and wherein the IPMP Terminal stores the acquired IPMP Tool with a corresponding part of the IPMP Tool List information in the memory of the IPMP terminal;

the IPMP Terminal further including a BIFS decoder, an audio decoder, and a video decoder, at least one of which decrypts an encrypted key in IPMP information using the license or key information, at least one of which decrypts the content using the acquired encryption key and acquires the first content, and at least one of which decodes the first content for presentation by the IPMP terminal, wherein the IPMP Tool Manager obtains information related to an IPMP Tool suitable for the IPMP terminal from a parsed IPMP Tool List in a header of the content stream.

4. A method for a flexible IPMP system configured for providing and protecting content on an IPMP terminal, comprising:

parsing a content stream, including an IPMP Tool List in a header of the content stream, with a parsing unit of an IPMP Tool Manager of the IPMP terminal in order to obtain information related to an IPMP Tool suitable for the IPMP terminal;

interpreting an IPMP Tool List Flag, content ID, and IPMP Tool List; and acquiring a designated IPMP Tool based on the IPMP Tool List from a Terminal-Tool Message Interface, wherein the Terminal-Tool Message Interface obtains the designated Tool from at least one of a local memory in which the designated Tool is preloaded or pre-encoded, a peripheral device tool location, a remote terminal side tool location, and the content stream, wherein acquiring the IPMP Tool further includes:

preloading, pre-encoding, or downloading a table to the IPMP terminal wherein IPMP Tool IDs relating to IPMP Tools are defined in the table, the table including fields for IPMP Tool IDs associated with future IPMP Tools, and part of the IPMP Tool IDs are defined as an IPMP Tool Type;

extracting an IPMP Tool ID from the IPMP Tool List;

acquiring an IPMP Tool Location identifier presented in the IPMP Tool List;

acquiring in addition to the IPMP Tool Location identifier an IPMP Tool Format ID;

selecting an IPMP Tool in an appropriate format to match an IPMP terminal platform; and finding the IPMP Tool from the acquired location; the IPMP Tool Manager obtaining information related to an IPMP Tool suitable for the IPMP terminal by parsing the IPMP Tool List in a header of the content stream.

5. A method for a flexible and shared IPMP system configured for providing and protecting content on an IPMP terminal, comprising:

automatically sending a request to a content distributor and authenticating user rights;

receiving a license or key information from the content distributor after the user rights authentication succeeds;

parsing the license or key information with the IPMP terminal;

storing the license or key information in a memory of the IPMP terminal;

parsing a content stream, including an IPMP Tool List in a header of the content stream, with a parsing unit of an IPMP Tool Manager of the IPMP terminal in order to obtain information related to an IPMP Tool suitable for the IPMP terminal;

interpreting an IPMP Tool List Flag, content ID, and IPMP Tool List;

acquiring a designated IPMP Tool based on the IPMP Tool List from a Terminal-Tool Message Interface, wherein the Terminal-Tool Message Interface obtains the designated Tool from at least one of a local memory in which the designated Tool is preloaded or pre-encoded, a peripheral device tool location, a remote terminal side tool location, and the content stream;

storing the acquired IPMP Tool with a corresponding part of the IPMP Tool List in a memory of the IPMP terminal; and decrypting and decoding the content stream using the license or key information in conjunction with the IPMP Tool stored in the memory.

6. A method for a flexible and shared IPMP system configured for providing and protecting content on an IPMP terminal, comprising:

sending a request to a content distributor and authenticating user rights;

receiving a license or key information from the content distributor;
parsing the license or key information with the IPMP terminal;
storing the license or key information in a memory of the IPMP terminal;
parsing a content stream, including an IPMP Tool List in a header of the content stream, with a parsing unit of an IPMP Tool Manager of the IPMP terminal in order to obtain information related to an IPMP Tool suitable for the IPMP terminal;
interpreting an IPMP Tool List Flag, content ID, and IPMP Tool List;
acquiring a designated IPMP Tool based on the IPMP Tool List from a Terminal-Tool Message Interface, wherein the Terminal-Tool Message Interface obtains the designated Tool from at least one of a local memory in which the designated Tool is preloaded or pre-encoded, a peripheral device tool location, a remote terminal side tool location, and the content stream;
storing the acquired IPMP Tool with a corresponding part of the IPMP Tool List in a memory of the IPMP terminal;
decrypting an encrypted key using the license or key information;
acquiring the decrypted encryption key to encrypt the content on a content provider side;
decrypting the content using the decrypted encryption key and acquiring a first content; and
decoding the first content for presentation by the IPMP terminal.

* * * * *